(12) United States Patent
Holmgren

(10) Patent No.: US 12,147,630 B2
(45) Date of Patent: Nov. 19, 2024

(54) OPTICAL TOUCH SENSOR

(71) Applicant: Neonode Inc., Stockholm (SE)

(72) Inventor: Stefan Johannes Holmgren, Sollentuna (SE)

(73) Assignee: Neonode Inc., Stockholm (SE)

( * ) Notice: Subject to any disclaimer, the term of this patent is extended or adjusted under 35 U.S.C. 154(b) by 0 days.

(21) Appl. No.: 18/327,419

(22) Filed: Jun. 1, 2023

(65) Prior Publication Data

US 2023/0325035 A1  Oct. 12, 2023

Related U.S. Application Data

(63) Continuation of application No. 17/487,195, filed on Sep. 28, 2021, now Pat. No. 11,669,210.

(60) Provisional application No. 63/085,838, filed on Sep. 30, 2020.

(51) Int. Cl.
*G06F 3/042* (2006.01)
(52) U.S. Cl.
CPC .................................. *G06F 3/0421* (2013.01)
(58) Field of Classification Search
CPC ............................ G06F 3/0421; G02B 5/0205
See application file for complete search history.

(56) References Cited

U.S. PATENT DOCUMENTS

| 4,243,879 | A | 1/1981 | Carroll et al. |
| 4,267,443 | A | 5/1981 | Carroll et al. |
| 4,301,447 | A | 11/1981 | Funk et al. |
| 4,518,249 | A | 5/1985 | Murata et al. |
| 4,550,250 | A | 10/1985 | Mueller et al. |
| 4,588,258 | A | 5/1986 | Hoopman |

(Continued)

FOREIGN PATENT DOCUMENTS

| CN | 1924620 A | 3/2007 |
| CN | 101387930 A | 3/2009 |

(Continued)

OTHER PUBLICATIONS

Hodges, S., Izadi, S., Butler, A., Rrustemi A., Buxton, B., "ThinSight: Versatile Multitouch Sensing for Thin Form-Factor Displays." UIST'07, Oct. 7-10, 2007. <http://www.hci.iastate.edu/REU09/pub/main/telerobotics_team_papers/thinsight_versatile_multitouch_sensing_for_thin_formfactor_displays.pdf>.

(Continued)

*Primary Examiner* — Patrick N Edouard
*Assistant Examiner* — Joseph P Fox
(74) *Attorney, Agent, or Firm* — Soquel Group, LLC

(57) ABSTRACT

A method for detecting locations of objects in a plane, including emit light beams, one at a time, at locations along a first edge of a detection area, refract each light beam into multiple divergent light beams, direct each of the divergent beams to arrive at a respective pair of focusing lenses mounted along a second edge of the detection area, opposite the first edge, wherein an intensity profile of each divergent beam has maximum intensity along the center of the beam, for each of the focusing lenses, measure an intensity profile of that portion of the divergent beam that enters the focusing lens, for each pair of focusing lenses receiving a single divergent beam, compare the measured intensity profiles for light arriving at each lens, and determine a location of an object that partially blocks at least one of the divergent beams, based on the compares.

20 Claims, 31 Drawing Sheets

(56) References Cited

U.S. PATENT DOCUMENTS

| | | |
|---|---|---|
| 4,641,426 A | 2/1987 | Hartman et al. |
| 4,645,920 A | 2/1987 | Carroll et al. |
| 4,672,364 A | 6/1987 | Lucas |
| 4,703,316 A | 10/1987 | Sherbeck |
| 4,710,760 A | 12/1987 | Kasday |
| 4,737,626 A | 4/1988 | Hasegawa |
| 4,737,631 A | 4/1988 | Sasaki et al. |
| 4,761,637 A | 8/1988 | Lucas et al. |
| 4,782,328 A | 11/1988 | Denlinger |
| 4,790,028 A | 12/1988 | Ramage |
| 4,847,606 A | 7/1989 | Beiswenger |
| 4,868,912 A | 9/1989 | Doering |
| 4,880,969 A | 11/1989 | Lawrie |
| 4,905,174 A | 2/1990 | Ouchi |
| 4,928,094 A | 5/1990 | Smith |
| 5,003,505 A | 3/1991 | McClelland |
| 5,016,008 A | 5/1991 | Gruaz |
| 5,036,187 A | 7/1991 | Yoshida et al. |
| 5,053,758 A | 10/1991 | Cornett et al. |
| 5,119,079 A | 6/1992 | Hube et al. |
| 5,162,783 A | 11/1992 | Moreno |
| 5,179,369 A | 1/1993 | Person et al. |
| 5,194,863 A | 3/1993 | Barker et al. |
| 5,196,835 A | 3/1993 | Blue et al. |
| 5,220,409 A | 6/1993 | Bures |
| 5,283,558 A | 2/1994 | Chan |
| 5,406,307 A | 4/1995 | Hirayama et al. |
| 5,414,413 A | 5/1995 | Tamaru et al. |
| 5,422,494 A | 6/1995 | West |
| 5,463,725 A | 10/1995 | Henckel et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,605,406 A | 2/1997 | Bowen |
| 5,612,719 A | 3/1997 | Beernink et al. |
| 5,618,232 A | 4/1997 | Martin |
| 5,729,250 A | 3/1998 | Bishop et al. |
| 5,748,185 A | 5/1998 | Stephan et al. |
| 5,785,439 A | 7/1998 | Bowen |
| 5,825,352 A | 10/1998 | Bisset et al. |
| 5,838,308 A | 11/1998 | Knapp et al. |
| 5,880,462 A | 3/1999 | Hsia |
| 5,880,743 A | 3/1999 | Moran et al. |
| 5,886,697 A | 3/1999 | Naughton et al. |
| 5,889,236 A | 3/1999 | Gillespie et al. |
| 5,900,863 A | 5/1999 | Numazaki |
| 5,900,875 A | 5/1999 | Haitani et al. |
| 5,914,709 A | 6/1999 | Graham et al. |
| 5,936,615 A | 8/1999 | Waters |
| 5,943,043 A | 8/1999 | Furuhata et al. |
| 5,943,044 A | 8/1999 | Martinelli et al. |
| 5,946,134 A | 8/1999 | Benson et al. |
| 5,956,030 A | 9/1999 | Conrad et al. |
| 5,988,645 A | 11/1999 | Downing |
| 6,010,061 A | 1/2000 | Howell |
| 6,023,265 A | 2/2000 | Lee |
| 6,031,989 A | 2/2000 | Cordell |
| 6,035,180 A | 3/2000 | Kubes et al. |
| 6,052,279 A | 4/2000 | Friend et al. |
| 6,073,036 A | 6/2000 | Heikkinen et al. |
| 6,085,204 A | 7/2000 | Chijiwa et al. |
| 6,091,405 A | 7/2000 | Lowe et al. |
| 6,246,395 B1 | 6/2001 | Goyins et al. |
| 6,259,436 B1 | 7/2001 | Moon et al. |
| 6,292,179 B1 | 9/2001 | Lee |
| 6,323,846 B1 | 11/2001 | Westerman et al. |
| 6,333,735 B1 | 12/2001 | Anvekar |
| 6,337,873 B1 | 1/2002 | Goering et al. |
| 6,340,979 B1 | 1/2002 | Beaton et al. |
| 6,346,935 B1 | 2/2002 | Nakajima et al. |
| 6,356,287 B1 | 3/2002 | Ruberry et al. |
| 6,359,632 B1 | 3/2002 | Eastty et al. |
| 6,362,468 B1 | 3/2002 | Murakami et al. |
| 6,411,283 B1 | 6/2002 | Murphy |
| 6,421,042 B1 | 7/2002 | Omura et al. |
| 6,429,857 B1 | 8/2002 | Masters et al. |
| 6,456,952 B1 | 9/2002 | Nathan |
| 6,529,920 B1 | 3/2003 | Arons et al. |
| 6,542,191 B1 | 4/2003 | Yonezawa |
| 6,549,217 B1 | 4/2003 | De Greef et al. |
| 6,570,557 B1 | 5/2003 | Westerman et al. |
| 6,597,345 B2 | 7/2003 | Hirshberg |
| 6,628,268 B1 | 9/2003 | Harada et al. |
| 6,639,584 B1 | 10/2003 | Li |
| 6,677,932 B1 | 1/2004 | Westerman |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,727,917 B1 | 4/2004 | Chew et al. |
| 6,734,883 B1 | 5/2004 | Wynn et al. |
| 6,757,002 B1 | 6/2004 | Oross et al. |
| 6,762,077 B2 | 7/2004 | Schuurmans et al. |
| 6,788,292 B1 | 9/2004 | Nako et al. |
| 6,803,906 B1 | 10/2004 | Morrison et al. |
| 6,833,827 B2 | 12/2004 | Lui et al. |
| 6,836,367 B2 | 12/2004 | Seino et al. |
| 6,857,746 B2 | 2/2005 | Dyner |
| 6,864,882 B2 | 3/2005 | Newton |
| 6,874,683 B2 | 4/2005 | Keronen et al. |
| 6,888,536 B2 | 5/2005 | Westerman et al. |
| 6,944,557 B2 | 9/2005 | Hama et al. |
| 6,947,032 B2 | 9/2005 | Morrison et al. |
| 6,954,197 B2 | 10/2005 | Morrison et al. |
| 6,958,749 B1 | 10/2005 | Matsushita et al. |
| 6,972,401 B2 | 12/2005 | Akitt et al. |
| 6,972,834 B1 | 12/2005 | Oka et al. |
| 6,985,137 B2 | 1/2006 | Kaikuranta |
| 6,988,246 B2 | 1/2006 | Kopitzke et al. |
| 6,992,660 B2 | 1/2006 | Kawano et al. |
| 7,006,077 B1 | 2/2006 | Uusimaki |
| 7,007,239 B1 | 2/2006 | Hawkins et al. |
| 7,030,861 B1 | 4/2006 | Westerman et al. |
| 7,042,444 B2 | 5/2006 | Cok |
| 7,099,553 B1 | 8/2006 | Graham et al. |
| 7,133,032 B2 | 11/2006 | Cok |
| 7,155,683 B1 | 12/2006 | Williams |
| 7,159,763 B2 | 1/2007 | Yap et al. |
| 7,170,590 B2 | 1/2007 | Kishida |
| 7,176,905 B2 | 2/2007 | Baharav et al. |
| 7,184,030 B2 | 2/2007 | McCharles et al. |
| 7,225,408 B2 | 5/2007 | ORourke |
| 7,232,986 B2 | 6/2007 | Worthington et al. |
| 7,254,775 B2 | 8/2007 | Geaghan et al. |
| 7,265,748 B2 | 9/2007 | Ryynanen |
| 7,283,845 B2 | 10/2007 | De Bast |
| 7,286,063 B2 | 10/2007 | Gauthey et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2 | 9/2008 | Ho |
| 7,435,940 B2 | 10/2008 | Eliasson et al. |
| 7,441,196 B2 | 10/2008 | Gottfurcht et al. |
| 7,442,914 B2 | 10/2008 | Eliasson et al. |
| 7,464,110 B2 | 12/2008 | Pyhalammi et al. |
| 7,465,914 B2 | 12/2008 | Eliasson et al. |
| 7,469,381 B2 | 12/2008 | Ording |
| 7,474,816 B2 | 1/2009 | Payne |
| 7,477,241 B2 | 1/2009 | Lieberman et al. |
| 7,479,949 B2 | 1/2009 | Jobs et al. |
| 7,520,050 B2 | 4/2009 | Graham |
| 7,633,300 B2 | 12/2009 | Keroe et al. |
| 7,663,607 B2 | 2/2010 | Hotelling et al. |
| 7,705,835 B2 | 4/2010 | Eikman |
| 7,800,594 B2 | 9/2010 | Nakamura et al. |
| 7,812,828 B2 | 10/2010 | Westerman et al. |
| 7,818,691 B2 | 10/2010 | Irvine |
| 7,855,716 B2 | 12/2010 | McCreary et al. |
| 7,880,724 B2 | 2/2011 | Nguyen et al. |
| 7,880,732 B2 | 2/2011 | Goertz |
| 7,957,615 B2 | 6/2011 | Juni et al. |
| 8,022,941 B2 | 9/2011 | Smoot |

(56) References Cited

U.S. PATENT DOCUMENTS

| | | |
|---|---|---|
| 8,023,780 B2 | 9/2011 | Juni |
| 8,068,101 B2 | 11/2011 | Goertz |
| 8,095,879 B2 | 1/2012 | Goertz |
| 8,120,595 B2 | 2/2012 | Kukulj et al. |
| 8,120,625 B2 | 2/2012 | Hinckley |
| 8,130,210 B2 | 3/2012 | Saxena et al. |
| 8,139,045 B2 | 3/2012 | Jang et al. |
| 8,193,498 B2 | 6/2012 | Cavallucci et al. |
| 8,243,047 B2 | 8/2012 | Chiang et al. |
| 8,243,048 B2 | 8/2012 | Kent et al. |
| 8,269,740 B2 | 9/2012 | Sohn et al. |
| 8,289,299 B2 | 10/2012 | Newton |
| 8,350,831 B2 | 1/2013 | Drumm |
| 8,426,799 B2 | 4/2013 | Drumm |
| 8,471,830 B2 | 6/2013 | Goertz |
| 8,482,547 B2 | 7/2013 | Christiansson et al. |
| 8,508,505 B2 | 8/2013 | Shin et al. |
| 8,520,323 B2 | 8/2013 | Machida |
| 8,531,435 B2 | 9/2013 | Drumm |
| 8,581,884 B2 | 11/2013 | Fahraeus et al. |
| 8,587,562 B2 | 11/2013 | Goertz et al. |
| 8,674,963 B2 | 3/2014 | Cornish et al. |
| 8,674,966 B2 | 3/2014 | Jansson et al. |
| 8,933,876 B2 | 1/2015 | Galor et al. |
| 9,292,132 B2 | 3/2016 | An et al. |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0030641 A1 | 10/2001 | Suzuki |
| 2001/0043189 A1 | 11/2001 | Brisebois et al. |
| 2001/0055006 A1 | 12/2001 | Sano et al. |
| 2002/0002326 A1 | 1/2002 | Causey, III et al. |
| 2002/0018824 A1 | 2/2002 | Buazza et al. |
| 2002/0027549 A1 | 3/2002 | Hirshberg |
| 2002/0033805 A1 | 3/2002 | Fujioka |
| 2002/0046353 A1 | 4/2002 | Kishimoto |
| 2002/0060699 A1 | 5/2002 | DAgostini |
| 2002/0067346 A1 | 6/2002 | Mouton |
| 2002/0067348 A1 | 6/2002 | Masters et al. |
| 2002/0075243 A1 | 6/2002 | Newton |
| 2002/0075244 A1 | 6/2002 | Tani et al. |
| 2002/0108693 A1 | 8/2002 | Veligdan |
| 2002/0109843 A1 | 8/2002 | Ehsani et al. |
| 2002/0118177 A1 | 8/2002 | Newton |
| 2002/0171691 A1 | 11/2002 | Currans et al. |
| 2002/0173300 A1 | 11/2002 | Shtivelman et al. |
| 2002/0175900 A1 | 11/2002 | Armstrong |
| 2002/0191029 A1 | 12/2002 | Gillespie et al. |
| 2003/0002809 A1 | 1/2003 | Jian |
| 2003/0010043 A1 | 1/2003 | Ferragut |
| 2003/0013483 A1 | 1/2003 | Ausems et al. |
| 2003/0030656 A1 | 2/2003 | Ang et al. |
| 2003/0043207 A1 | 3/2003 | Duarte |
| 2003/0076306 A1 | 4/2003 | Zadesky et al. |
| 2003/0095102 A1 | 5/2003 | Kraft et al. |
| 2003/0098803 A1 | 5/2003 | Gourgey et al. |
| 2003/0122787 A1 | 7/2003 | Zimmerman et al. |
| 2003/0231308 A1 | 12/2003 | Granger |
| 2003/0234346 A1 | 12/2003 | Kao |
| 2004/0021643 A1 | 2/2004 | Hoshino et al. |
| 2004/0021681 A1 | 2/2004 | Liao |
| 2004/0046960 A1 | 3/2004 | Wagner et al. |
| 2004/0100510 A1 | 5/2004 | Milic-Frayling et al. |
| 2004/0109013 A1 | 6/2004 | Goertz |
| 2004/0125143 A1 | 7/2004 | Deaton et al. |
| 2004/0140961 A1 | 7/2004 | Cok |
| 2004/0201579 A1 | 10/2004 | Graham |
| 2004/0263482 A1 | 12/2004 | Goertz |
| 2005/0035956 A1 | 2/2005 | Sinclair et al. |
| 2005/0046621 A1 | 3/2005 | Kaikuranta |
| 2005/0073508 A1 | 4/2005 | Pittel et al. |
| 2005/0091612 A1 | 4/2005 | Stabb et al. |
| 2005/0104860 A1 | 5/2005 | McCreary et al. |
| 2005/0122308 A1 | 6/2005 | Bell et al. |
| 2005/0133702 A1 | 6/2005 | Meyer |
| 2005/0165615 A1 | 7/2005 | Minar |
| 2005/0174473 A1 | 8/2005 | Morgan et al. |
| 2005/0190162 A1 | 9/2005 | Newton |
| 2005/0253818 A1 | 11/2005 | Nettamo |
| 2005/0271319 A1 | 12/2005 | Graham |
| 2006/0001654 A1 | 1/2006 | Smits |
| 2006/0018586 A1 | 1/2006 | Kishida |
| 2006/0132454 A1 | 6/2006 | Chen et al. |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2007/0024598 A1 | 2/2007 | Miller et al. |
| 2007/0052693 A1 | 3/2007 | Watari |
| 2007/0082707 A1 | 4/2007 | Flynt et al. |
| 2007/0084989 A1 | 4/2007 | Lange et al. |
| 2007/0103436 A1 | 5/2007 | Kong |
| 2007/0146318 A1 | 6/2007 | Juh et al. |
| 2007/0150842 A1 | 6/2007 | Chaudhri et al. |
| 2007/0152984 A1 | 7/2007 | Ording et al. |
| 2007/0164201 A1 | 7/2007 | Liess et al. |
| 2007/0165008 A1 | 7/2007 | Crockett |
| 2007/0176908 A1 | 8/2007 | Lipman et al. |
| 2008/0008472 A1 | 1/2008 | Dress et al. |
| 2008/0012850 A1 | 1/2008 | Keating, III |
| 2008/0013913 A1 | 1/2008 | Lieberman et al. |
| 2008/0049341 A1 | 2/2008 | Epstein et al. |
| 2008/0055273 A1 | 3/2008 | Forstall |
| 2008/0056068 A1 | 3/2008 | Yeh et al. |
| 2008/0068353 A1 | 3/2008 | Lieberman et al. |
| 2008/0074402 A1 | 3/2008 | Cornish et al. |
| 2008/0080811 A1 | 4/2008 | Deane |
| 2008/0086703 A1 | 4/2008 | Flynt et al. |
| 2008/0093542 A1 | 4/2008 | Lieberman et al. |
| 2008/0100593 A1 | 5/2008 | Skillman et al. |
| 2008/0111797 A1 | 5/2008 | Lee |
| 2008/0117176 A1 | 5/2008 | Ko et al. |
| 2008/0117183 A1 | 5/2008 | Yu et al. |
| 2008/0121442 A1 | 5/2008 | Boer et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0136790 A1 | 6/2008 | Hio |
| 2008/0158174 A1 | 7/2008 | Land et al. |
| 2008/0165190 A1 | 7/2008 | Min et al. |
| 2008/0168404 A1 | 7/2008 | Ording |
| 2008/0192025 A1 | 8/2008 | Jaeger et al. |
| 2008/0221711 A1 | 9/2008 | Trainer |
| 2008/0259053 A1 | 10/2008 | Newton |
| 2008/0266266 A1 | 10/2008 | Kent et al. |
| 2008/0273019 A1 | 11/2008 | Deane |
| 2008/0278460 A1 | 11/2008 | Arnett et al. |
| 2008/0297409 A1 | 12/2008 | Klassen et al. |
| 2008/0297487 A1 | 12/2008 | Hotelling et al. |
| 2009/0006418 A1 | 1/2009 | OMalley |
| 2009/0009944 A1 | 1/2009 | Yukawa et al. |
| 2009/0027357 A1 | 1/2009 | Morrison |
| 2009/0031208 A1 | 1/2009 | Robinson |
| 2009/0058833 A1 | 3/2009 | Newton |
| 2009/0064055 A1 | 3/2009 | Chaudhri et al. |
| 2009/0066673 A1 | 3/2009 | Molne et al. |
| 2009/0096994 A1 | 4/2009 | Smits |
| 2009/0102815 A1 | 4/2009 | Juni |
| 2009/0135162 A1 | 5/2009 | Van De Wijdeven et al. |
| 2009/0139778 A1 | 6/2009 | Butler et al. |
| 2009/0153519 A1 | 6/2009 | Suarez Rovere |
| 2009/0167724 A1 | 7/2009 | Xuan et al. |
| 2009/0187840 A1 | 7/2009 | Moosavi |
| 2009/0189878 A1 | 7/2009 | Goertz et al. |
| 2009/0192849 A1 | 7/2009 | Hughes et al. |
| 2009/0285383 A1 | 11/2009 | Tsuei |
| 2009/0322699 A1 | 12/2009 | Hansson |
| 2009/0322701 A1 | 12/2009 | Dsouza et al. |
| 2010/0002291 A1 | 1/2010 | Fukuyama |
| 2010/0017872 A1 | 1/2010 | Goertz et al. |
| 2010/0023895 A1 | 1/2010 | Benko et al. |
| 2010/0079407 A1 | 4/2010 | Suggs |
| 2010/0079409 A1 | 4/2010 | Sirotich et al. |
| 2010/0079412 A1 | 4/2010 | Chiang et al. |

(56) References Cited

U.S. PATENT DOCUMENTS

| | | |
|---|---|---|
| 2010/0095234 A1 | 4/2010 | Lane |
| 2010/0133424 A1 | 6/2010 | Lindsay |
| 2010/0149073 A1 | 6/2010 | Chaum et al. |
| 2010/0193259 A1 | 8/2010 | Wassvik |
| 2010/0238138 A1 | 9/2010 | Goertz et al. |
| 2010/0238139 A1 | 9/2010 | Goertz et al. |
| 2010/0289755 A1 | 11/2010 | Zhu et al. |
| 2010/0295821 A1 | 11/2010 | Chang et al. |
| 2010/0302185 A1 | 12/2010 | Han et al. |
| 2010/0321344 A1 | 12/2010 | Yen et al. |
| 2011/0007032 A1 | 1/2011 | Goertz |
| 2011/0043485 A1 | 2/2011 | Goertz |
| 2011/0043826 A1 | 2/2011 | Kiyose |
| 2011/0044579 A1 | 2/2011 | Travis et al. |
| 2011/0050639 A1 | 3/2011 | Challener et al. |
| 2011/0050650 A1 | 3/2011 | McGibney et al. |
| 2011/0057906 A1 | 3/2011 | Raynor et al. |
| 2011/0063214 A1 | 3/2011 | Knapp |
| 2011/0074734 A1 | 3/2011 | Wassvik et al. |
| 2011/0074735 A1 | 3/2011 | Wassvik et al. |
| 2011/0074736 A1 | 3/2011 | Takakura |
| 2011/0075418 A1 | 3/2011 | Mallory et al. |
| 2011/0090176 A1 | 4/2011 | Christiansson et al. |
| 2011/0115748 A1 | 5/2011 | Xu |
| 2011/0116104 A1 | 5/2011 | Kao et al. |
| 2011/0128554 A1 | 6/2011 | Nakanishi |
| 2011/0134064 A1 | 6/2011 | Goertz |
| 2011/0148820 A1 | 6/2011 | Song |
| 2011/0157097 A1 | 6/2011 | Hamada et al. |
| 2011/0163956 A1 | 7/2011 | Zdralek |
| 2011/0163996 A1 | 7/2011 | Wassvik et al. |
| 2011/0163998 A1 | 7/2011 | Goertz et al. |
| 2011/0167628 A1 | 7/2011 | Goertz et al. |
| 2011/0169780 A1 | 7/2011 | Goertz et al. |
| 2011/0169781 A1 | 7/2011 | Goertz et al. |
| 2011/0169782 A1 | 7/2011 | Goertz et al. |
| 2011/0175533 A1 | 7/2011 | Holman et al. |
| 2011/0175852 A1 | 7/2011 | Goertz et al. |
| 2011/0179368 A1 | 7/2011 | King et al. |
| 2011/0181552 A1 | 7/2011 | Goertz et al. |
| 2011/0205175 A1 | 8/2011 | Chen |
| 2011/0205186 A1 | 8/2011 | Newton et al. |
| 2011/0210946 A1 | 9/2011 | Goertz et al. |
| 2011/0216040 A1 | 9/2011 | Yen et al. |
| 2011/0221706 A1 | 9/2011 | McGibney et al. |
| 2011/0227487 A1 | 9/2011 | Nichol et al. |
| 2011/0227874 A1 | 9/2011 | Fahraeus et al. |
| 2011/0242056 A1 | 10/2011 | Lee et al. |
| 2011/0248151 A1 | 10/2011 | Holcombe et al. |
| 2011/0261020 A1 | 10/2011 | Song et al. |
| 2012/0038584 A1 | 2/2012 | Liu |
| 2012/0045170 A1 | 2/2012 | Shibata et al. |
| 2012/0050226 A1 | 3/2012 | Kato |
| 2012/0056821 A1 | 3/2012 | Goh |
| 2012/0068971 A1 | 3/2012 | Pemberton-Pigott |
| 2012/0068973 A1 | 3/2012 | Christiansson et al. |
| 2012/0086672 A1 | 4/2012 | Tseng et al. |
| 2012/0094723 A1 | 4/2012 | Goertz |
| 2012/0098753 A1 | 4/2012 | Lu |
| 2012/0098794 A1 | 4/2012 | Kleinert et al. |
| 2012/0176343 A1 | 7/2012 | Holmgren et al. |
| 2012/0188203 A1 | 7/2012 | Yao et al. |
| 2012/0188206 A1 | 7/2012 | Sparf et al. |
| 2012/0200536 A1 | 8/2012 | Cornish et al. |
| 2012/0212456 A1 | 8/2012 | Smits |
| 2012/0212457 A1 | 8/2012 | Drumm |
| 2012/0212458 A1 | 8/2012 | Drumm |
| 2012/0218226 A1 | 8/2012 | Wang et al. |
| 2012/0218229 A1 | 8/2012 | Drumm |
| 2012/0223916 A1 | 9/2012 | Kukulj |
| 2012/0280942 A1 | 11/2012 | Kent et al. |
| 2012/0306793 A1 | 12/2012 | Liu et al. |
| 2012/0327039 A1 | 12/2012 | Kukulj |
| 2013/0021302 A1 | 1/2013 | Drumm |
| 2013/0027352 A1 | 1/2013 | Holloway et al. |
| 2013/0044071 A1 | 2/2013 | Hu et al. |
| 2013/0127788 A1 | 5/2013 | Drumm |
| 2013/0135259 A1 | 5/2013 | King et al. |
| 2013/0141395 A1* | 6/2013 | Holmgren ........... G06F 3/04883 345/175 |
| 2013/0215034 A1 | 8/2013 | Oh et al. |
| 2014/0320459 A1 | 10/2014 | Pettersson et al. |
| 2018/0292053 A1 | 10/2018 | Minor et al. |
| 2018/0296915 A1 | 10/2018 | Holmgren et al. |
| 2019/0011567 A1 | 1/2019 | Pacala et al. |

FOREIGN PATENT DOCUMENTS

| | | |
|---|---|---|
| CN | 102053762 A | 5/2011 |
| CN | 201965588 U | 9/2011 |
| EP | 0330767 A1 | 9/1989 |
| EP | 0513694 A2 | 11/1992 |
| EP | 0601651 A1 | 6/1994 |
| EP | 0618528 A1 | 10/1994 |
| EP | 0703525 A1 | 3/1996 |
| EP | 0884691 A2 | 12/1998 |
| EP | 1059603 A2 | 12/2000 |
| EP | 1906632 A2 | 4/2008 |
| JP | 03-216719 A | 9/1991 |
| JP | 04-322204 A | 11/1992 |
| JP | 05-173699 A | 7/1993 |
| JP | 06-39621 U | 5/1994 |
| JP | 10-269012 A | 10/1998 |
| JP | 11-232024 A | 8/1999 |
| JP | 2014513375 A | 5/2014 |
| WO | 8600446 A1 | 1/1986 |
| WO | 8600447 A1 | 1/1986 |
| WO | 0102949 A1 | 1/2001 |
| WO | 0140922 A2 | 6/2001 |
| WO | 02095668 A1 | 11/2002 |
| WO | 03038592 A1 | 5/2003 |
| WO | 03083767 A2 | 10/2003 |
| WO | 2005026938 A2 | 3/2005 |
| WO | 2008004103 A2 | 1/2008 |
| WO | 2008133941 A2 | 11/2008 |
| WO | 2008147266 A1 | 12/2008 |
| WO | 2009008786 A1 | 1/2009 |
| WO | 2010015408 A1 | 2/2010 |
| WO | 2010093570 A1 | 8/2010 |
| WO | 2010121031 A1 | 10/2010 |
| WO | 2010134865 A1 | 11/2010 |

OTHER PUBLICATIONS

Moeller, J. et al., ZeroTouch: An Optical Multi-Touch and Free-Air Interaction Architecture, Proc. CHI 2012 Proceedings of the 2012 annual conference extended abstracts on Human factors in computing systems, May 5, 2012, pp. 2165-2174. ACM New York, NY, USA.

Moeller, J. et al., ZeroTouch: A Zero-Thickness Optical Multi-Touch Force Field, CHI EA '11 Proceedings of the 2011 annual conference extended abstracts on Human factors in computing systems, May 2011, pp. 1165-1170. ACM New York, NY, USA.

Moeller, J. et al., IntangibleCanvas: Free-Air Finger Painting on a Projected Canvas, CHI EA '11 Proceedings of the 2011 annual conference extended abstracts on Human factors in computing systems, May 2011, pp. 1615-1620. ACM New York, NY, USA.

Moeller, J. et al., Scanning FTIR: Unobtrusive Optoelectronic Multi-Touch Sensing through Waveguide Transmissivity Imaging, TEI '10 Proceedings of the fourth international conference on Tangible, embedded, and embodied interaction, Jan. 2010, pp. 73-76. ACM New York, NY, USA.

Van Loenen, Evert, et al., Entertable: A Solution for Social Gaming Experiences, Tangible Play Workshop, Jan. 28, 2007, pp. 16-19, Tangible Play Research and Design for Tangible and Tabletop Games, Workshop at the 2007 Intelligent User Interfaces Conference, Workshop Proceedings.

Goertz, Magnus, "Optical Touch Screen with Wide Beam Transmitters and Receivers", Provisional U.S. Appl. No. 61/317,255, filed Mar. 24, 2010.

(56) References Cited

OTHER PUBLICATIONS

Johnson, M., "Enhanced Optical Touch Input Panel", IBM Technical Disclosure Bulletin vol. 28, No. 4, Sep. 1985 pp. 1760-1762.
John Wallace, "LED Optics: Efficient LED collimators have simple design" available at http://www.laserfocusworld.com/articles/print/volume-48/issue-06/world-news/efficient-led-collimators-have-simple-design.html [Jun. 1, 2014 11:00:04 AM].
Non-final Office action received for U.S. Appl. No. 13/053,229 mailed on Nov. 27, 2013, 11 pages.
Final Office action received for U.S. Appl. No. 13/053,229 mailed on Aug. 15, 2014, 15 pages.
Search Report and Written Opinion for PCT application No. PCT/US2011/029191 mailed on Jul. 26, 2011, 38 pages.
International Preliminary Report on Patentability for PCT application No. PCT/US2011/029191 mailed on Sep. 25, 2012, 17 pages.
Notice of Allowance for U.S. Appl. No. 13/311,366 mailed on Jan. 12, 2015, 10 pages.
International Preliminary Report on Patentability for PCT application No. PCT/US2014/040579 mailed on Dec. 8, 2015, 8 pages.
Search Report and Written Opinion for PCT application No. PCT/US2014/040579 mailed on Dec. 5, 2014, 11 pages.
First Office action for Korean patent application No. 10-2015-7036757 mailed on Nov. 2, 2016, 4 pages.
Non-final Office action received for U.S. Appl. No. 14/588,462 mailed on Apr. 8, 2015, 11 pages.
Notice of Allowance for U.S. Appl. No. 14/588,462 mailed on Aug. 14, 2015, 8 pages.
Non-final Office action received for U.S. Appl. No. 14/730,765 mailed on Sep. 22, 2016, 10 pages.
Non-final Office action received for U.S. Appl. No. 14/730,765 mailed on May 17, 2017, 12 pages.
Non-final Office action received for U.S. Appl. No. 14/730,880 mailed on Dec. 14, 2015, 8 pages.
Final Office action received for U.S. Appl. No. 14/730,880 mailed on Sep. 22, 2016, 9 pages.
Non-final Office action received for U.S. Appl. No. 14/730,880 mailed on Mar. 9, 2017, 14 pages.
Notice of Allowance for U.S. Appl. No. 14/960,369 mailed on Jan. 3, 2017, 9 pages.
Sumriddetchkajorn, Sarun & Amarit, Ratthasart. (2005). "Optical Touch Sensor Technology", 2005 IEEE LEOS Annual Meeting Conference Proceedings, pp. 824-825.
International Patent Application No. PCT/US2021/052370. Search Report and Written Opinion, Dec. 23, 2021, 7 pages.

\* cited by examiner

SECTION B-B

SECTION B-B

OPTICAL TOUCH SENSOR

PRIORITY REFERENCE TO PROVISIONAL APPLICATION

This application claims priority benefit from U.S. Provisional Patent Application No. 63/085,838, entitled OPTICAL TOUCH SENSOR, and filed on Sep. 30, 2020, by inventor Stefan Holmgren.

FIELD OF THE INVENTION

The field of the present invention is touchscreens, particularly optical touchscreens.

BACKGROUND OF THE INVENTION

Reference is made to FIG. 1, which is a simplified illustration of a first prior art optical touchscreen, described in U.S. Pat. No. 9,471,170, entitled LIGHT-BASED TOUCH SCREEN WITH SHIFT-ALIGNED EMITTER AND RECEIVER LENSES, and assigned to the assignee of the present invention. This touchscreen 900 is surrounded by lens arrays 300-303. Emitters 100-121 are arranged along two adjacent edges of the touchscreen, and detectors 200-223 are arranged along the remaining two edges. The emitters along edges of the touchscreen are shift-aligned with respect to the detectors along the opposite edges of the touchscreen. Lenses 300 and 301 are configured to spread light from each emitter to arrive at two opposite detectors, and lenses 302 and 303 are configured such that each detector receives light from two opposite emitters.

FIG. 1 shows horizontal light beams 400-407 and vertical light beams 408-421, each beam originating at a respective emitter and reaching two detectors. Each emitter is synchronously activated with its corresponding detectors by processor 901. Processor 901 also stores the detector outputs and calculates touch locations based on these outputs.

Reference is made to FIG. 2 which is a simplified illustration of a second prior art optical touchscreen, described in U.S. Pat. No. 9,063,614, entitled OPTICAL TOUCH SCREENS, and assigned to the assignee of the present invention. This touchscreen 902 is surrounded by lens arrays 304-307. Emitters 122-174 are arranged along two adjacent edges of the touchscreen, and detectors 224-278 are arranged along the remaining two edges. In contrast to lenses 300 and 301 in FIG. 1, lenses 305 and 306 are configured to spread light from each emitter to arrive at numerous detectors. Similarly, lenses 304 and 307 are configured such that each detector receives light from numerous emitters, e.g., #8 channels per diode. FIG. 2 illustrates the dense mesh of detected light beams 422-474. Each emitter is synchronously activated with its corresponding detectors by processor 903. Processor 903 also stores the detector outputs and calculates touch locations based on these outputs.

The touchscreen system illustrated in FIG. 1, has relatively narrow light channels which provide good signal levels for touch detection. Furthermore, each light beam is shaped to provide signal gradients across the width of the beam. These signal gradients enable identifying precisely where within the beam the blocking object is located by comparing the amounts of blocked light detected by different emitter-detector pairs. Thus, this system provides excellent information from each light channel. In addition, this system works well with a large pitch (denoted p) between components (e.g., p is between 15 mm and 18 mm). However, this system is not optimal for suppressing ghost touches, as the vertical light beams are nearly parallel, as are the horizontal light beams.

Reference is made to FIG. 3, which is a simplified illustration of the ghost touch problem. Blocked beams (detections) 725-728 create ambiguity as to which of locations 910-913 contain a touch object. In this case, the actual objects are located at locations 910 and 911.

The ghost touch problem exists in the touchscreen of FIG. 1. In contrast, the touchscreen system illustrated in FIG. 2 provides a range of different angles for the horizontal light beams and for the vertical light beams, e.g., ±20°. This enables the system to suppress ghost touches well. This system works best with slightly more components, e.g., $p \approx 12.5$ mm, making this system more expensive. The wide angle of the emitter beams provides lower signal levels for each emitter-detector pair, and furthermore, each emitter-detector light channel does not feature the signal gradients across the width of the beam as in the system of FIG. 1, making touch location calculation less exact. The touchscreen system of FIG. 2 also features many more light channels and therefore is more costly in terms of activating all of the emitter-detector channels and storing and processing the detection signals.

The following table summarizes the features of the systems illustrated in FIGS. 1 and 2.

TABLE I

| Features of touchscreen systems in FIGS. 1 and 2 | |
|---|---|
| FIG. 1 | FIG. 2 |
| good gradients | no gradients |
| good signal levels | low signal levels |
| few components | intermediate number of components |
| few channels | many channels |
| bad angles for ghost touch suppression | excellent angles for ghost touch suppression |

Publication No. US 2012/0188206 A1 (the "'206 publication"), entitled OPTICAL TOUCH SCREEN WITH TRI-DIRECTIONAL MICRO-LENSES is a publication of U.S. patent application Ser. No. 13/424,472, which is assigned to the assignee of the present invention. The '206 publication discusses an optical touchscreen in which each emitter beam is split into three separate beams, particularly with reference to FIGS. 83, 89, 90, 98 and 99 in the '206 publication. The motivation for the optical touchscreen in which each emitter beam is split into three separate beams, particularly with reference to FIGS. 83, 89, 90, 98 and 99 in the '206 publication went as follows. More information is needed in order to solve the ghost touch problem in the optical touchscreen of FIG. 1, namely the problem of trying to uniquely identify multiple touches based on insufficient positional data. The solution proposed in the '206 publication is to provide more detection channels, i.e., more grids of light beams. The more different the grids are, the better the information content. So, an added grid skewed at 45 degrees to the existing grid gives the most information without adding many channels.

However, the additional 45-degree grid requires that the detector photodiodes (PDs) be placed along all four edges of the screen, and thus, the configuration of FIG. 1 with LEDs on two edges of the touchscreen and PDs along the opposite edges of the touchscreen cannot be used. This leads to a configuration of alternating LEDs and PDs along the edges of the screen.

Then there is the choice of whether to use half-lenses on two of the four edges of the screen, or only standard lenses on all sides, namely, should the lenses along opposite edges of the screen be aligned, or shift-aligned as in FIG. 1. There are advantages to a shift-aligned configuration, as discussed inter alia in U.S. Pat. No. 9,471,170. However, a shift-aligned configuration is complicated in view of the additional 45-degree Channels. Thus, an aligned configuration is required in consideration of the additional 45-degree Channels.

The aligned configuration of lenses on opposite edges of the screen means that the LED and PD components on opposite edges of the screen are aligned as well. However, it had to be determined whether each LED is opposite another LED or opposite a PD. Assuming the central beam from each LED expands as it crosses the screen and therefore reaches three components along the opposite edge of the screen-if each LED is opposite another LED, then the central beam from one LED reaches two PDs. However, this causes trouble with bad information in the center, since the middle of this central beam is directed at an LED, not a PD. On the other hand, if each LED is opposite a PD, the channel is straight across from LED to PD, but the central beam spanning three opposite components arrives at only one PD (and the two LEDs on either side of that PD). In this case, there would be no overlap of channels and the possibilities of using interpolation of several signals (channels) would be severely limited. The benefits of interpolating overlapping channels is discussed inter alia in U.S. Pat. No. 9,471,170. The configuration aligning each LED opposite a PD and not featuring overlapping channels can be used for relatively large objects, as is indicated in '206 publication, paragraph [0332].

The way to provide overlapping channels is discussed in the '206 publication at paragraph [0333]; namely, interleaving different light channels using small facets to get an even distribution on the tri-directional pattern. The many small facets dilute the signal by spreading light in several directions and also by interleaving neighboring beams. Moreover, the system discussed in the '206 publication at paragraph [0333] is less flexible than the system discussed in U.S. Pat. No. 9,471,170, in terms of pitch width, as the '206 publication requires an even number of pitches on both sides of the screen. The signals are shaped by the focal length and the pitch, and although there is good information, it cannot be tailored much, and it looks like FIGS. 94 and 95 in the '206 publication.

The present invention addresses the shortcomings of the prior art. Other advantages of the present invention will become apparent from the description below.

SUMMARY

There is thus provided in accordance with an embodiment of the present invention an optical sensor for detecting locations of objects, including a plurality of lenses arranged along two opposite edges of a rectangular detection area, a circuit board mounted underneath the lenses, a plurality of light emitters mounted on the circuit board along a specific one of the two opposite edges of the rectangular detection area, each light emitter operable when activated to project light beams through a respective one of the lenses, wherein the lenses are configured to split the light beam projected from each light emitter into a plurality of divergent light beams directed across the rectangular detection area to respective pluralities of the lenses that are arranged along the edge of the rectangular detection area that is opposite the specific edge, wherein a light intensity of each directed beam is maximized along the center of the directed beam and a distribution of light intensity within each thus directed beam is known, a plurality of light detectors mounted on the circuit board along the edge of the rectangular detection area that is opposite the specific edge, each detector receiving the light beams directed across the rectangular detection area through a respective one of the lenses that are arranged along the edge of the rectangular detection area opposite that specific edge, and a processor receiving outputs from the light detectors, and calculating a location of an object in the rectangular detection area based on the known distribution of light intensity within each directed beam, and the received outputs.

According to further features in embodiments of the invention, the plurality of light emitters is shift-aligned with respect to the plurality of light detectors.

According to further features in embodiments of the invention, the lenses are designed such that light beams of different widths are directed by the lenses across the rectangular detection area.

According to further features in embodiments of the invention, the lenses are designed such that those of the lenses that are arranged near corners of the rectangular detection area direct light beams across the rectangular detection area that are narrower than the light beams directed across the rectangular detection area by the others of said lenses.

According to further features in embodiments of the invention, those of the lenses that are arranged near corners of the rectangular detection area are smaller than the others of the lenses.

According to further features in embodiments of the invention, those of the lenses that are arranged near corners of the rectangular detection area are designed to split the light beams from respective ones of the light emitters into fewer divergent light beams than the others of the lenses.

According to further features in embodiments of the invention, the lenses spread the pluralities of divergent light beams in fan-like shapes, each fan having an apex angle, wherein those of the lenses that are arranged near corners of the rectangular detection area generate fans of light beams having apex angles that are smaller than the apex angles of the fans of light beams generated by the others of the lenses.

BRIEF DESCRIPTION OF THE DRAWINGS

The present invention will be more fully understood and appreciated from the following detailed description, taken in conjunction with the drawings in which.

In the disclosure and figures, the following numbering scheme is used. Like numbered elements are similar but not necessarily identical.

TABLE II

| Elements of Figures | | |
|---|---|---|
| Type of element | Numbering range | FIGS. |
| light emitters | 100-199 | 1, 2, 4-6, 8, 13-32, 34 |

TABLE II-continued

| Elements of Figures | | |
|---|---|---|
| Type of element | Numbering range | FIGS. |
| light detectors | 200-299 | 1, 2, 4-6, 13-32, 34 |
| lenses | 300-399 | 1, 2, 4-6, 9-32, 34 |
| light beams | 400-699 | 1, 2, 4-6, 8, 14, 15, 17-23, 25-30 |
| light detection | 700-799 | 3-6 |
| other items | 900-999 | 1-5, 7-9, 13-32, 34 |

DETAILED DESCRIPTION

Figure 1:
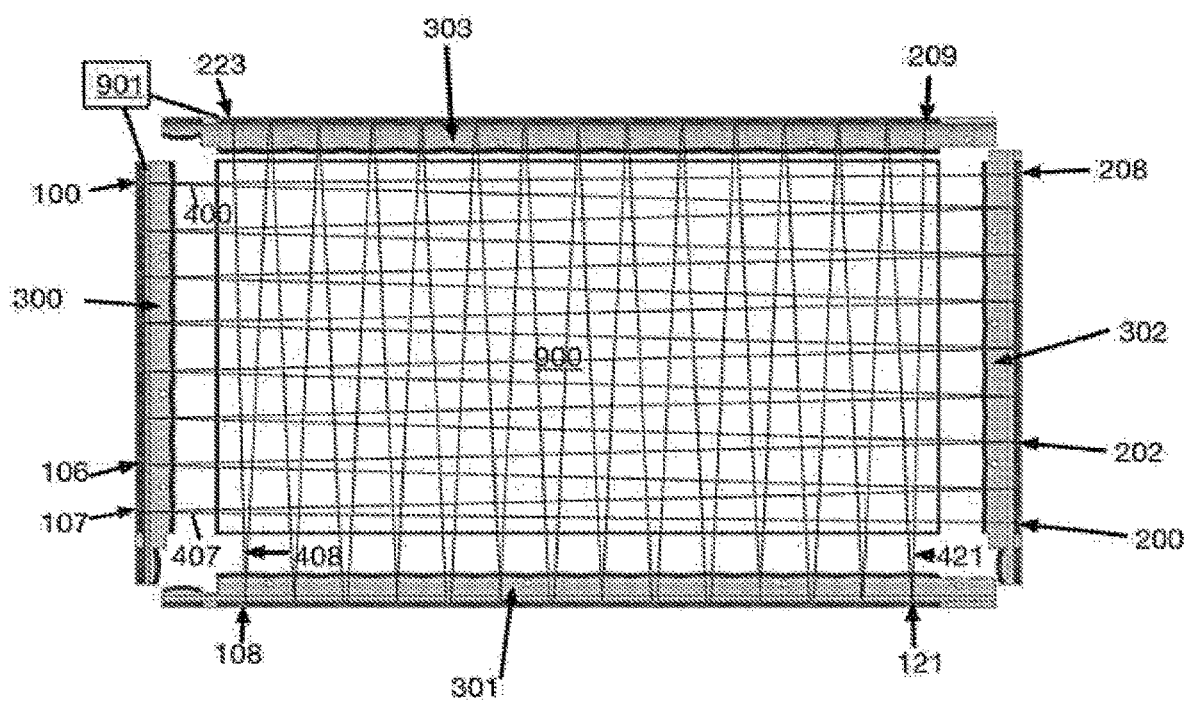
FIG. 1 is a simplified illustration of a first prior art optical touchscreen.
Figure 2:
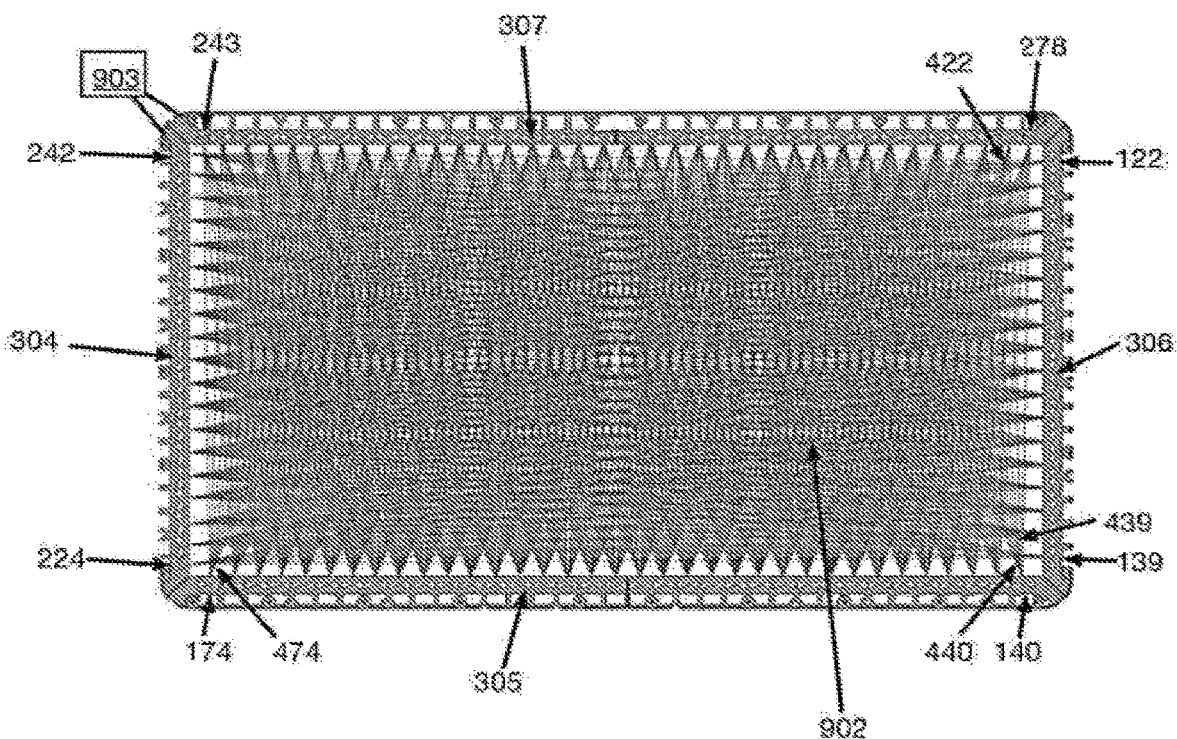
FIG. 2 is a simplified illustration of a second prior art optical touchscreen.
Figure 3:
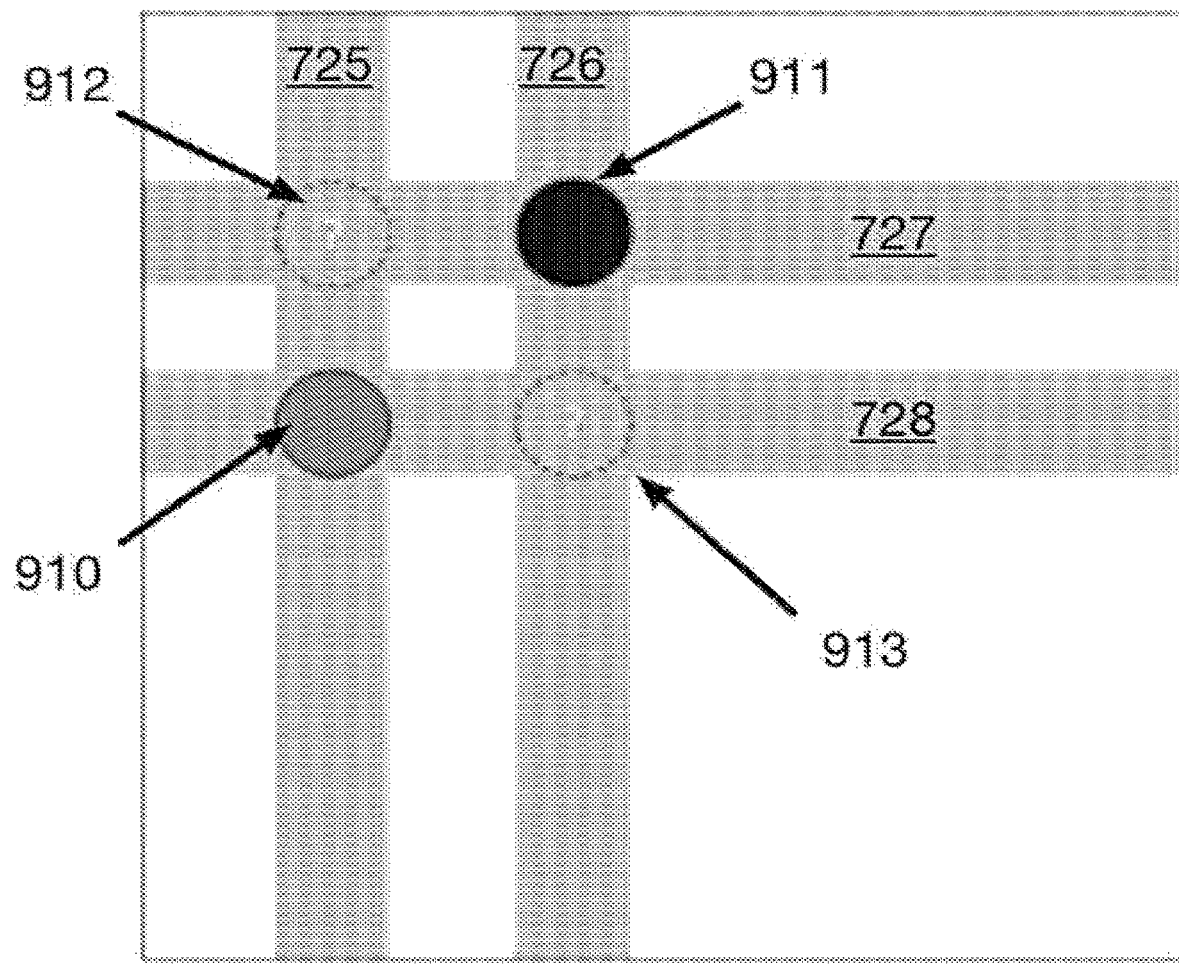
FIG. 3 is a simplified illustration of ghost touches.

The following table summarizes certain features of a touchscreen according to the present invention, in relation to features of the prior art touchscreens illustrated in FIGS. 1 and 2.

TABLE III

| Features of the Present Invention | | |
|---|---|---|
| FIG. 1 | Present invention | FIG. 2 |
| good gradients | good gradients | no gradients |
| good signal levels | intermediate signal levels | low signal levels |
| few components | few components | intermediate number of components |
| few channels | intermediate no. channels | many channels |
| bad angles for ghost touch suppression | excellent angles for ghost touch suppression | excellent angles for ghost touch suppression |

Figure 4:
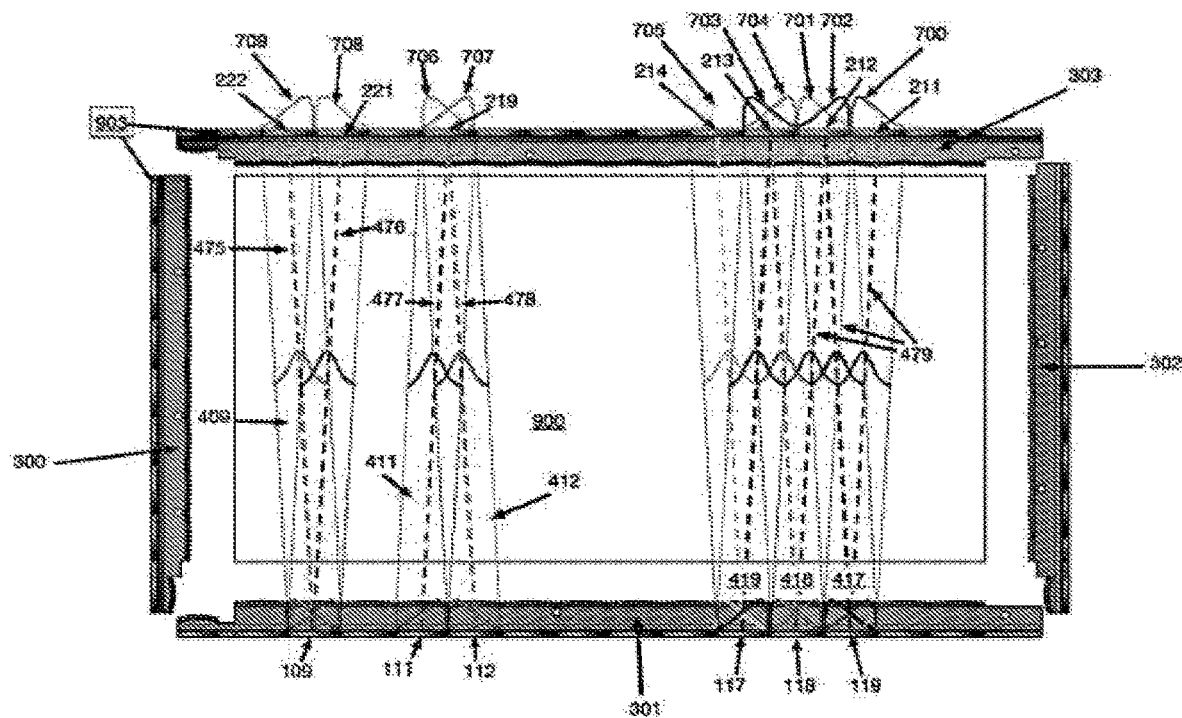
FIG. 4 is a simplified illustration of the principles of calculating a touch location based on optical signals, in the optical touchscreen of FIG. 1, according to the present invention.

Reference is made to FIG. 4, which is a simplified illustration of the principles of calculating a touch location based on optical signals, in the optical touchscreen of FIG. 1, according to the present invention. FIG. 4 illustrates signal gradients in a touchscreen embodiment. Emitter 109 projects vertical light beam 409 across detection area 900, detected by neighboring detectors 221 and 222. Specifically, beam portion 475 is detected by detector 222 and beam portion 476 is detected by detector 221. Beam portion 475 is shown as a parallelogram that extends from the lens at emitter 109 to the lens at detector 222, and beam portion 476 is shown as a parallelogram that extends from the lens at emitter 109 to the lens at detector 221; the dashed lines in beam portions 475 and 476 indicate the center of each beam portion. Lenses 301 shape beam 409 such that maximum intensity is along the center of the beam, and the intensity gradient is reduced toward the edges of the beam, as represented by detections 709 and 708. Lenses 303 are similar to lenses 301 and collect the incoming light onto the detectors. When an object blocks part of beam portion 475 from reaching detector 222 and part of beam portion 476 from reaching detector 221, the location of the object along the width of beam 409 is determined by comparing the detections at detectors 221 and 222: if the detections are equal, the object is along the beam's central axis, and if the detections are unequal, their ratio indicates how far the object is shifted to one side of the beam's center.

FIG. 4 also shows detector 219 receiving light from two emitters 111 and 112, specifically, portion 477 of the beam from emitter 111 and portion 478 of the beam from emitter 112 arrive at detector 219. As beam portions 477 and 478 overlap, the system determines where along the width of the overlap an object is positioned by comparing the detections of emitter-detector pair 111-219 with the detections of emitter-detector pair 112-219.

FIG. 4 shows vertical beams 417-419 from emitters 117-119 to detectors 211-214. Overlapping detected portions 479 of these beams illustrate that an object placed in detection area 900 will be detected by at least two emitter-detector pairs, i.e., {(e,d), (e,d+1)} or {(e,d), (e+1,d)}, where e and e+1 are two neighboring emitters and d and d+1 are two neighboring detectors. As explained above, the overlapping detections and the shaped light beams provide signal gradients that enable precise calculations of locations of objects touching the screen, or otherwise entering the plane of these light beams, by comparing the magnitude of detections of a single object by several emitter-detector pairs. One method of comparing these detections is by interpolation. The synchronized activation of emitter-detector pairs is controlled by processor 903. Processor 903 also stores detector outputs and calculates a location of a detected object based on those outputs.

FIG. 4 shows that the emitter lenses along two edges of detection area 900 are shift-aligned with the detector lenses along the opposite edges of detection area 900, and the beam from each emitter detected by two opposite detectors can be expressed as being detected by detectors that are offset +/−0.5 lens pitch from opposite the emitter. According to the present invention, light from each emitter is split into several beams detected by additional pairs of detectors to provide additional detection channels and more angles for ghost touch suppression.

Figure 23:
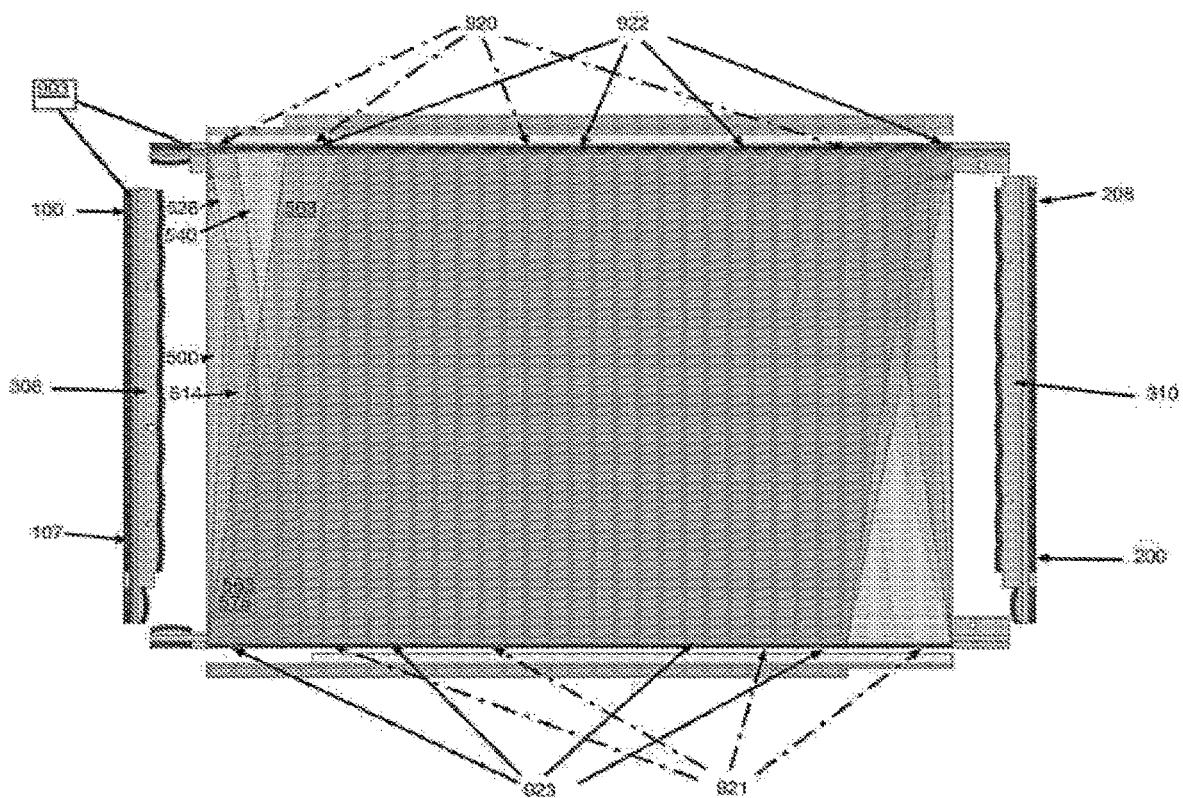
FIGS. 23 and 24 are simplified illustrations of the number of overlapping light beams provided for touch detection in different portions of a touchscreen that features the beams of FIGS. 14-22, in accordance with an embodiment of the present invention.
Figure 24:
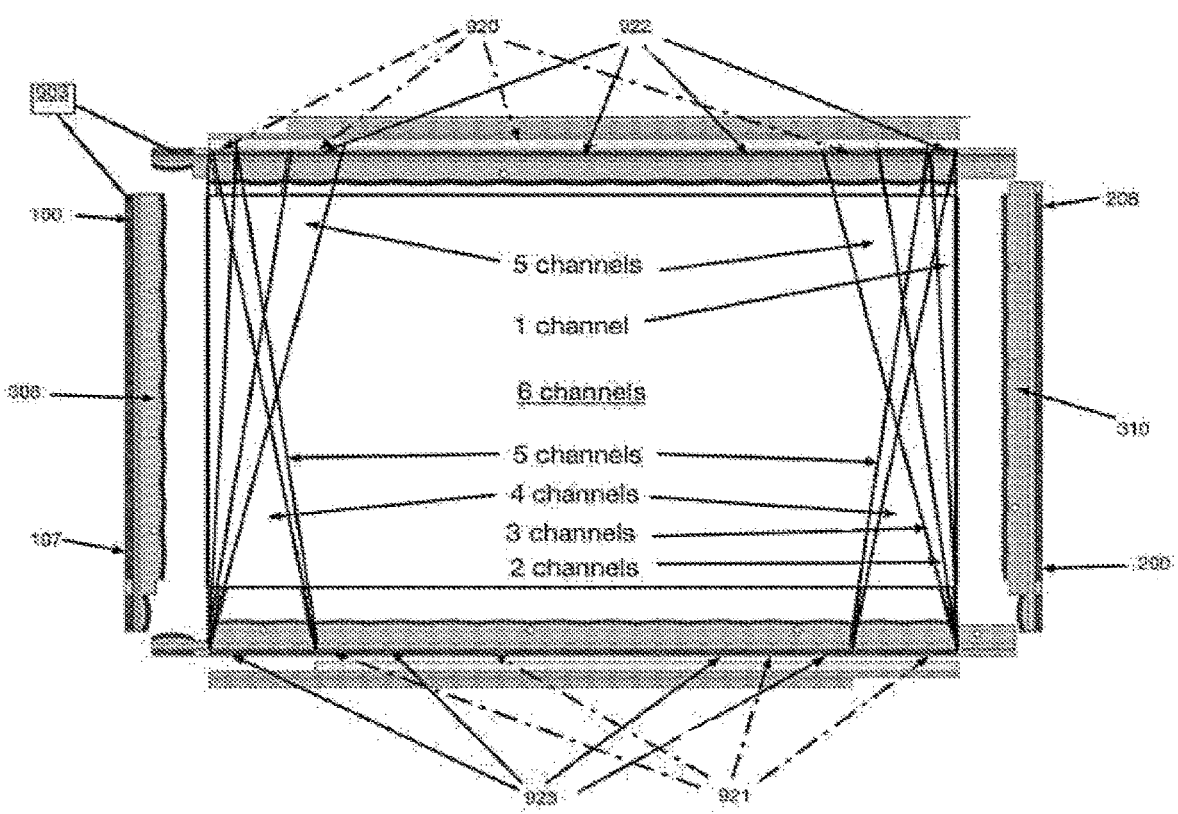

Thus, in certain embodiments of the invention, a first additional beam is directed towards detectors, along the opposite edge of the detection area, that are offset 1.5 and 2.5 lens pitches from opposite the emitter, and a second additional beam is directed towards detectors, along the opposite edge of the detection area, that are offset −1.5 and −2.5 lens pitches from opposite the emitter. These additional beams are illustrated in FIGS. 17-22. When all three sets of beams are provided, namely, the initial beam directed at the detectors that are offset +/−0.5 lens pitches from opposite the emitter, plus the two additional beams, six sets of detection channels are provided. This is illustrated in FIGS. 23 and 24.

Figure 30:
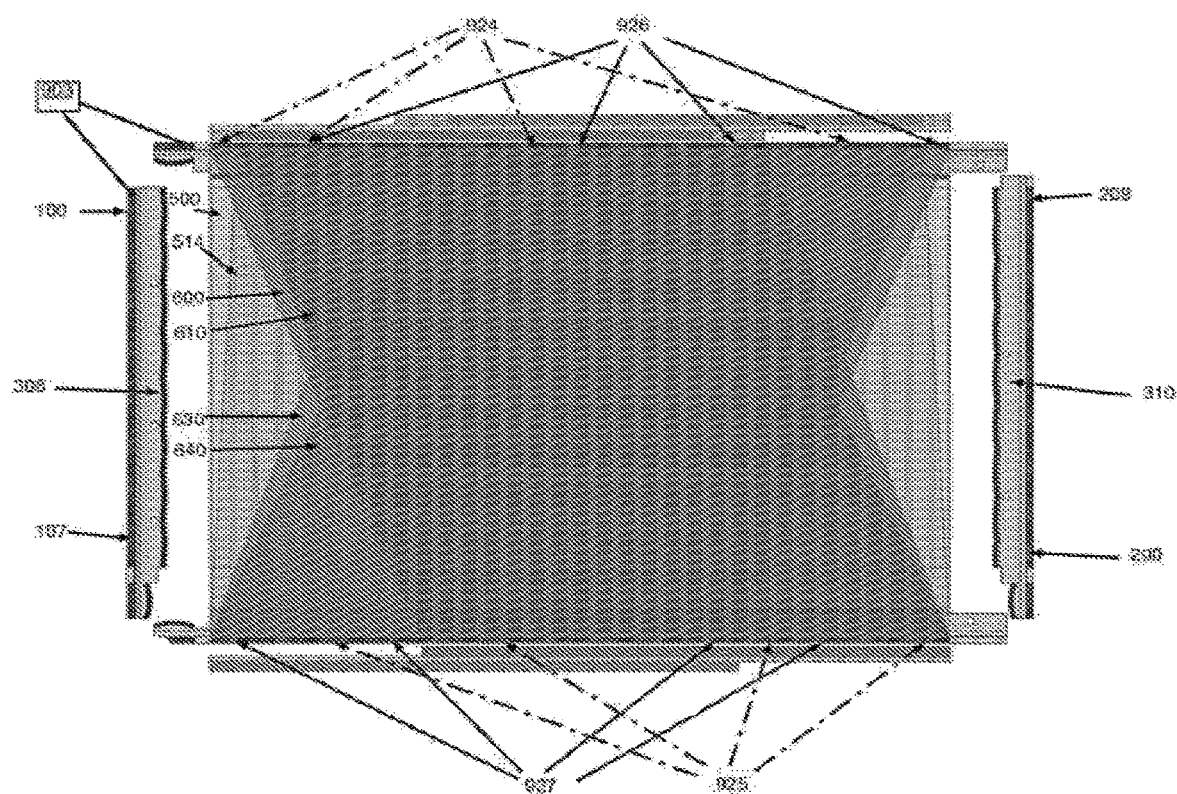
FIGS. 30 and 31 are simplified illustrations of the number of overlapping light beams provided for touch detection in different portions of a touchscreen, featuring the beams of FIGS. 4, 14, 15 and 25-29, in accordance with an embodiment of the present invention.
Figure 31:
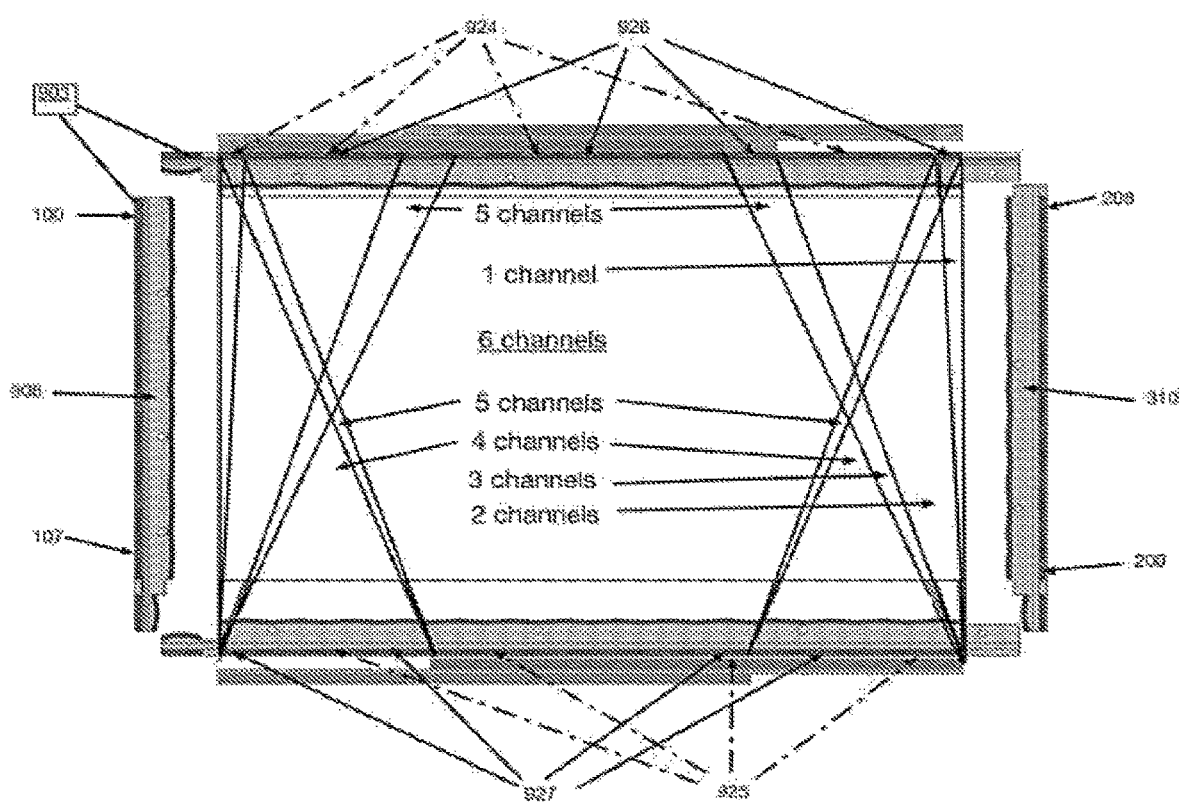
Figure 32:
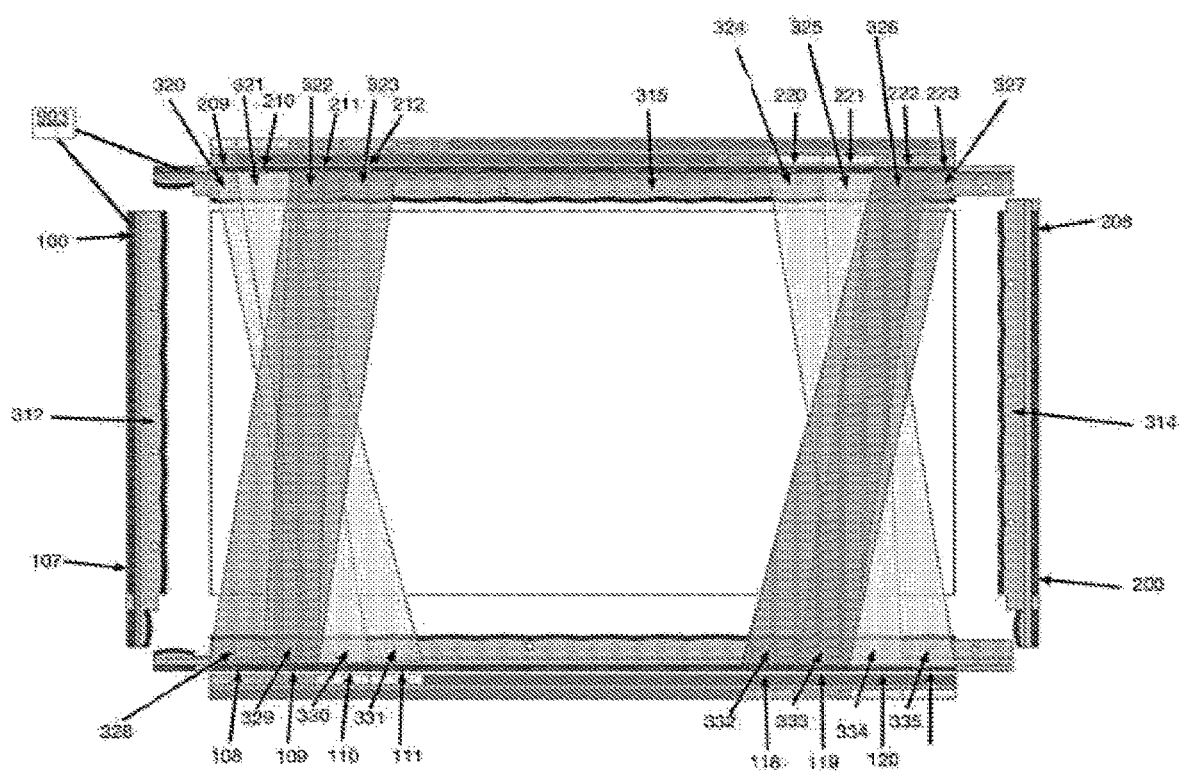
FIG. 32 is a simplified illustration of an optical touchscreen having different optics for outer and inner beams crossing the screen, in accordance with an embodiment of the present invention.

In other embodiments of the invention, different additional beams are used to provide a wider range of angles for ghost touch suppression; namely, a first additional beam is directed towards neighboring detectors that are offset 3.5 and 4.5 lens pitches from opposite the emitter, and a second additional beam is directed towards detectors that are offset −3.5 and −4.5 lens pitches from opposite the emitter. These additional beams are illustrated in FIGS. 25-29. When these beams are provided together with the initial beam directed at the detectors that are offset +/−0.5 lens pitches from the emitter, six sets of detection channels are provided, as illustrated in FIGS. 30 and 31. Still other embodiments of the invention provide additional beams with larger emitter-detector offsets, as illustrated in FIGS. 25-29, but provide additional beams with smaller emitter-detector offsets near the edges of the detection area, as illustrated in FIGS. 32 and 33.

Figure 5:
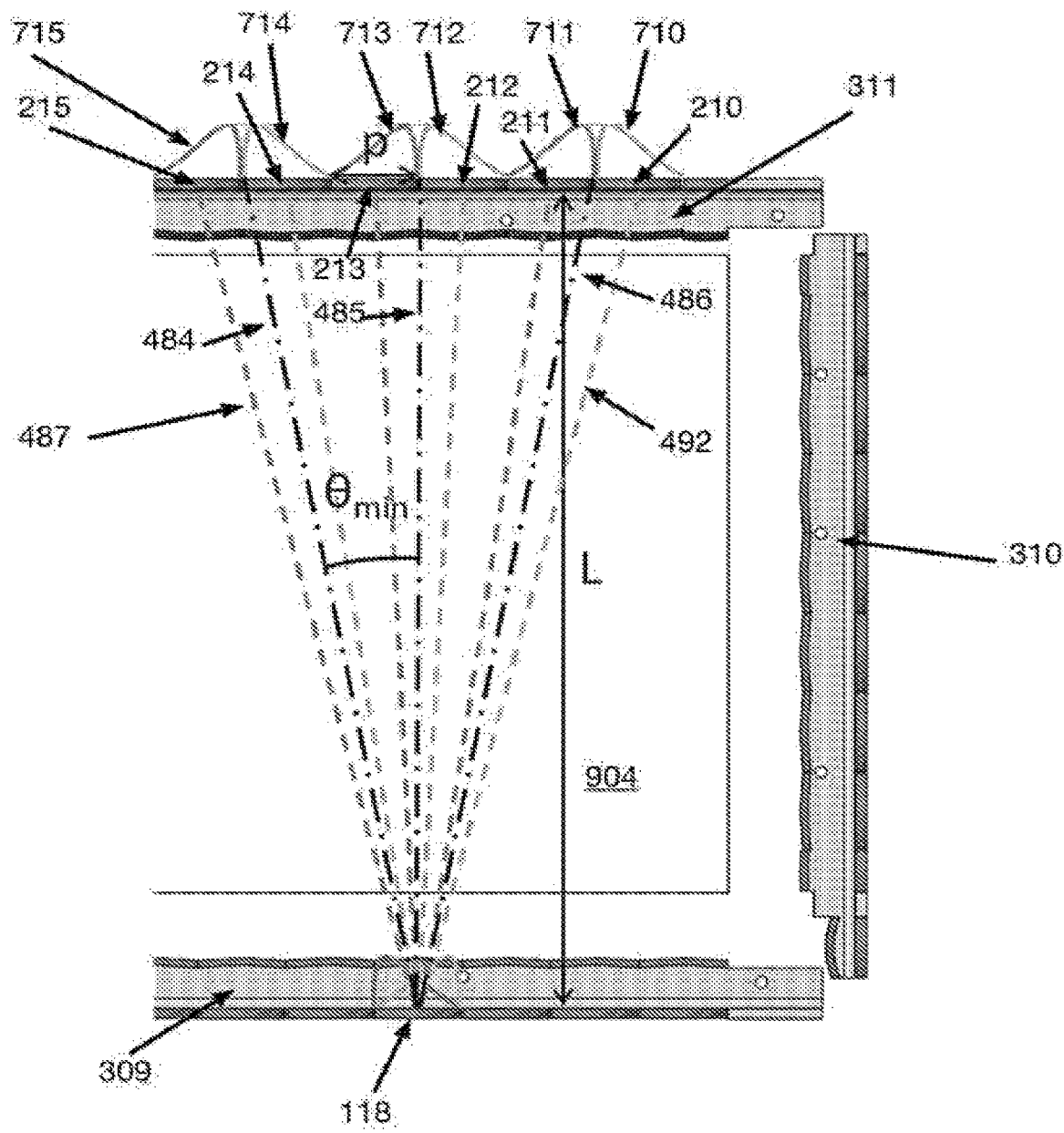
FIG. 5 is a simplified illustration of light from an emitter being split into three optical channels, in accordance with an embodiment of the present invention.

Reference is made to FIG. 5, which is a simplified illustration of light from an emitter being split into three optical channels, in accordance with an embodiment of the present invention. FIG. 5 illustrates splitting each emitter beam into three separate, diverging beams 484-486, each separate beam being shaped with a gradient as described hereinabove with respect to FIG. 4, such that the highest intensity is along the center of each of separate beam, and the light intensity is reduced from the center of the beam outward. These split, shaped beams are formed by lenses 309, and similar lenses 311 are provided at the detectors for directing beams in each of the three directions onto each detector. Each of beams 484-486 arrives at two detectors. Specifically, beam 484 arrives at detectors 214 and 215; beam 485 arrives at detectors 212 and 213; and beam 486 arrives at detectors 210 and 211. As such, the minimum angle between beams 484 and 485, and between beams 485 and 486, is $$\theta_{min} = \tan^{-1}\left(\frac{2p}{L}\right)$$

where p is the pitch between neighboring components and L is the distance between the row of emitters and the opposite row of detectors.

Although FIG. 5 shows each beam split into three separate, shaped beams, in other embodiments of the invention each beam is split into only two separate, shaped beams, providing a greater amount of light for each separate beam.

Figure 6:
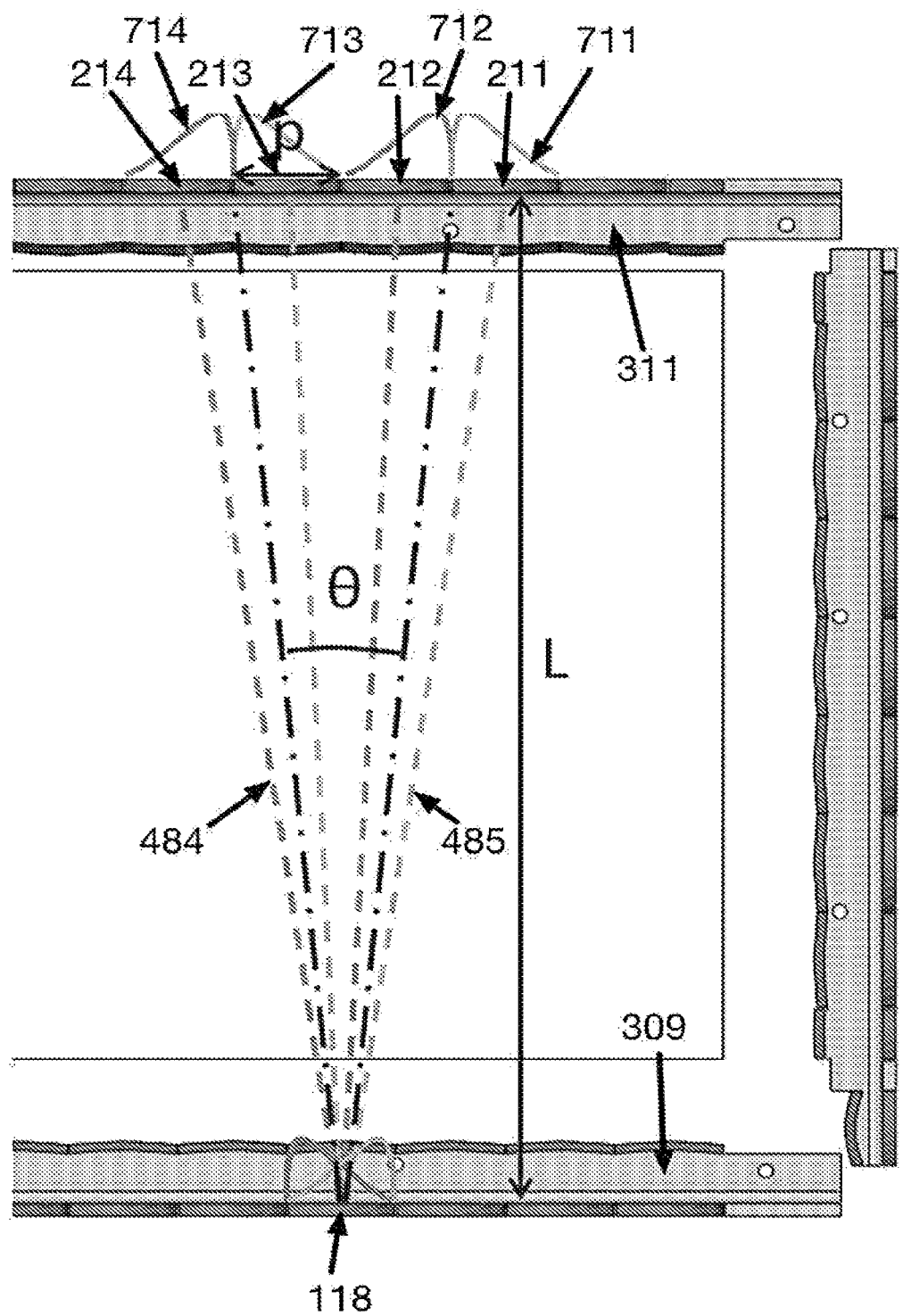
FIG. 6 is a simplified illustration of light from an emitter being split into two optical channels, in accordance with an embodiment of the present invention.

Reference is made to FIG. 6 illustrating light from emitter 118 being split into two separate beams 484 and 485, each separate beam being shaped with a gradient as described hereinabove with respect to FIGS. 4 and 5, such that the highest intensity is along the center of each separate beam, and the light intensity is reduced from the center of the beam outward. These split, shaped beams are formed by lenses 309, and similar lenses 311 are provided at the detectors for directing beams in each of the two directions onto the detectors. Each of beams 484 and 485 arrives at two detectors. Specifically, beam 484 arrives at detectors 213 and 214, and beam 485 arrives at detectors 211 and 212. As such, the minimum angle between beams 484 and 485, is $$\theta_{min} = \tan^{-1}\left(\frac{2p}{L}\right)$$

where p is the pitch between neighboring components and L is the distance between the row of emitters and the opposite row of detectors.

Beams 484 and 485 are both projected by emitter 118. Lenses 309 split and shape these two beams and direct them at detectors 211-214, via lenses 311. The detections at detectors 211-214 are indicated by sloping curves 711-714. The maximum intensity for each beam is along its center, indicated by the maximum of each curve 711-714 being near the beam center and declining outward.

Figure 7:
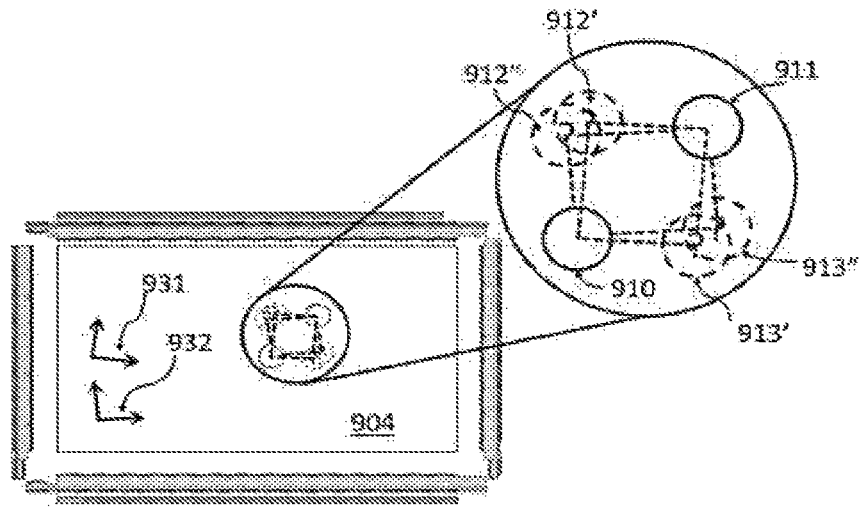
FIG. 7 is a simplified illustration of distinguishing an actual touch from a ghost touch, in accordance with embodiments of the present invention.

Reference is made to FIG. 7, which is a simplified illustration of distinguishing an actual touch from a ghost touch, in accordance with embodiments of the present invention. FIG. 7 shows two touches in detection area 904 and illustrates that, in a system with two diverging beams for each emitter as illustrated in FIG. 6, the locations of the four candidate touch points indicated by blocked left-sloping beams 484 of FIG. 6 are slightly different than the four candidate touch points indicated by the blocked right-sloping beams 485 of FIG. 6. Arrows 931 indicate the directions of the right-sloping vertical and horizontal beams, and arrows 932 indicate the directions of the left-sloping vertical and horizontal beams. The right-sloping beams indicate possible touch locations 910, 911, 912' and 913', and the left-sloping beams indicate possible touch locations 910, 911, 912" and 913". Thus, locations 910 and 911 at which actual objects are present are identical for both sets of beams, whereas the ghost locations 912 and 913 are not the same. Accordingly, by comparing the touch locations indicated by the different sets of beams, it is determined that locations that are identical for the different sets of beams are actual touch locations, and locations that are not identical for the different sets of beams are not touch locations. Put differently, by combining the touch detections from all of the beams, it is determined that locations whose detections by different sets of beams are concentrated at specific locations are actual touch locations, and locations for which the combined detections from different sets of beams are more diffuse are not touch locations. Splitting each emitter beam into three diverging beams provides a more robust solution to the ghost touch problem. In addition, the larger the angle between the diverging beams as discussed hereinbelow, the more robust the elimination of ghost touches.

Thus, splitting the light from each emitter into two or three beams provides different angled beams that resolve many ghost touch situations that the touchscreen of FIG. 1 cannot similarly resolve. In addition, the split beams cover most of the display area with many different overlapping beams, providing greater resolution and precision for calculating touch locations.

Figure 8:
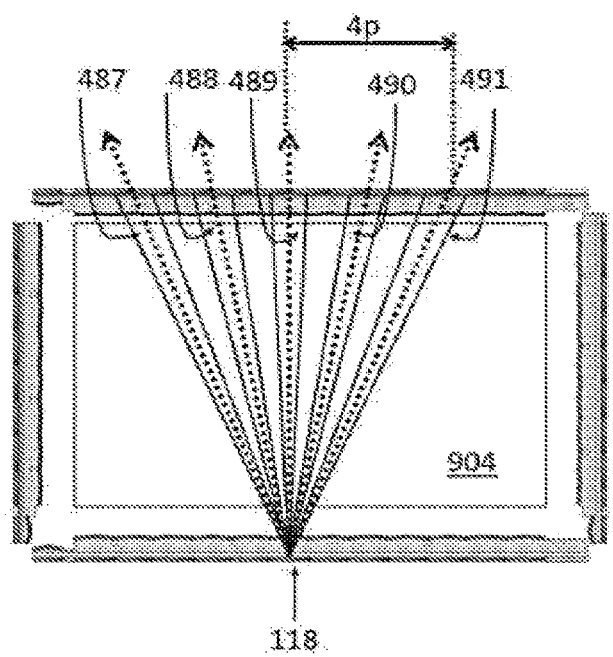
FIG. 8 is a simplified illustration of five different beams that may be created by a lens, in accordance with embodiments of the present invention.

Reference is made to FIG. 8, which is a simplified illustration of five different beams that may be created by a lens, in accordance with embodiments of the present invention. FIG. 8 shows five different beams 487-491 that may be created from emitter 118 by a lens. As discussed hereinabove, each of the five beams is shaped to have maximum intensity along the center with the intensity decreasing further from the central line. This beam shape enables identifying where within the width of the beam an object is located based on the amount of light it blocks. Each beam is directed toward a pair of detectors at the opposite edge of the detection area. In certain embodiments of the invention, each lens creates three of these five beams. In certain embodiments discussed hereinbelow the lenses farther from the corners of detection area 904 generate the central beam 489 and the two outer beams 487 and 491, in order to provide beams separated by large angles, whereas lenses closer to the corners of the detection area are configured to generate the three inner beams 488-490, as an outer beam 487 or 491 would be directed outside detection area 904 and would not reach a detector on the opposite edge.

Figures 9, 10:
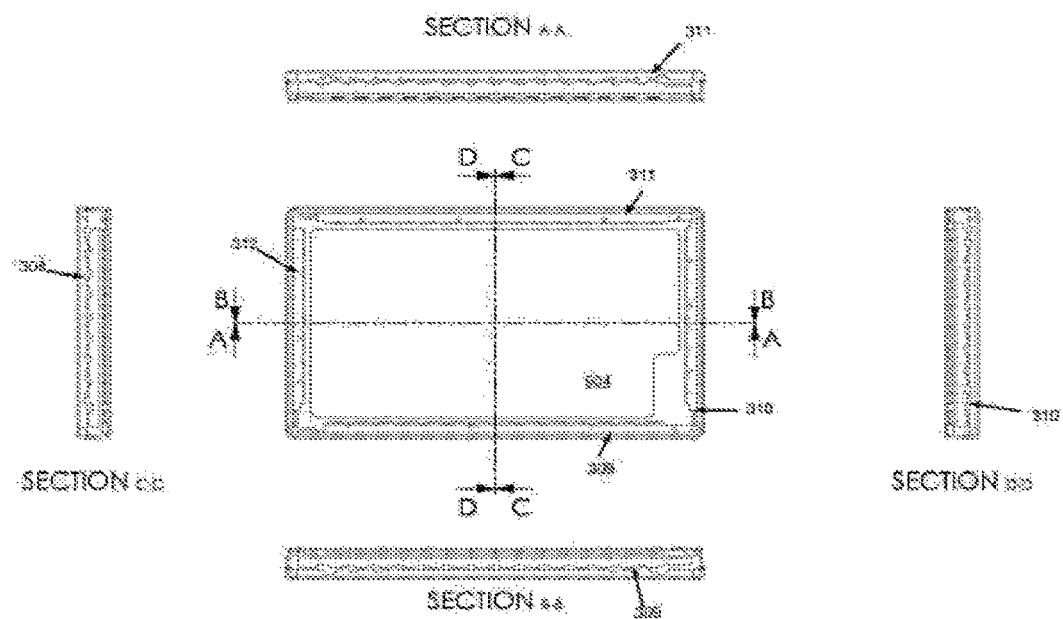
FIGS. 9-12 are illustrations of lenses used in an optical sensor, in accordance with an embodiment of the present invention.

Reference is made to FIGS. 9-12, which are illustrations of lenses used in an optical sensor, in accordance with an embodiment of the present invention. FIG. 9 shows a touchscreen having detection area 904 surrounded by lens structures 309-312, and cross-sections thereof.

FIG. 10 shows lens structure 309 of the touchscreen in FIG. 9. This lens structure is mounted above a series of light emitters, and it splits the light from each emitter into three separate beams. FIG. 10 shows focusing lenses 324 and 325, and lenses 327 and 328 that split the light into separate beams.

Figure 11:
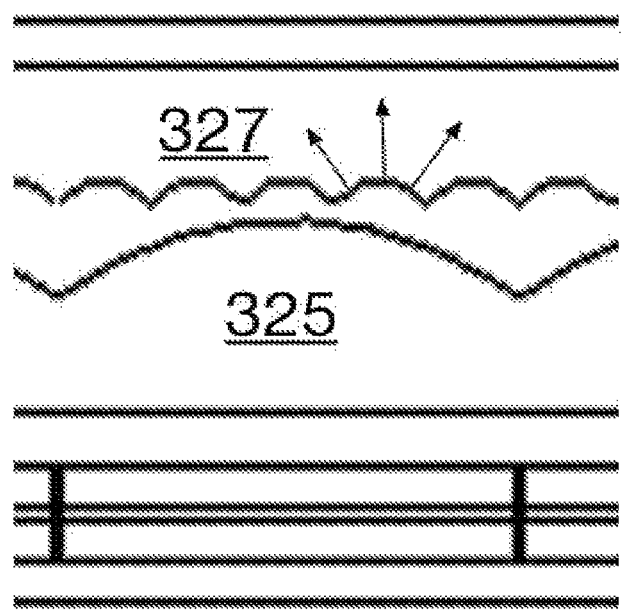

FIG. 11 shows one of focusing lenses 325 and the associated portion of lens 327, having a repeating three-facet pattern indicated by three arrows that split the light into three separate beams. In sensors configured with two beams for each emitter instead of three, lens 327 has a repeating sawtooth pattern of facets in two directions to create two diverging beams.

Figure 12:
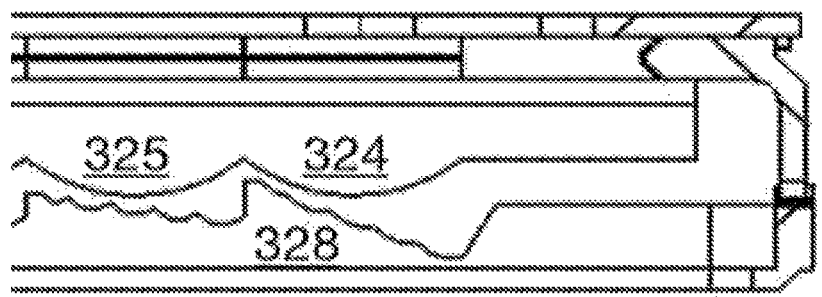

FIG. 12 shows a section of lens structure 309 near the corner of the touch detection area. This section includes focusing lens 324 and associated lens 328 for splitting the light. Because this lens is near a corner of the detection area, lens 328 is configured to direct the light so that the rightmost beam arrives at a detector on the opposite edge of the detection area, and in some embodiments this section splits the light into fewer beams than the other sections. In certain embodiments, this section of lenses is smaller than the others and is thus configured to create more concentrated beams of light than the other sections because an edge of the screen is covered by fewer overlapping beams than other screen sections.

Figure 13:
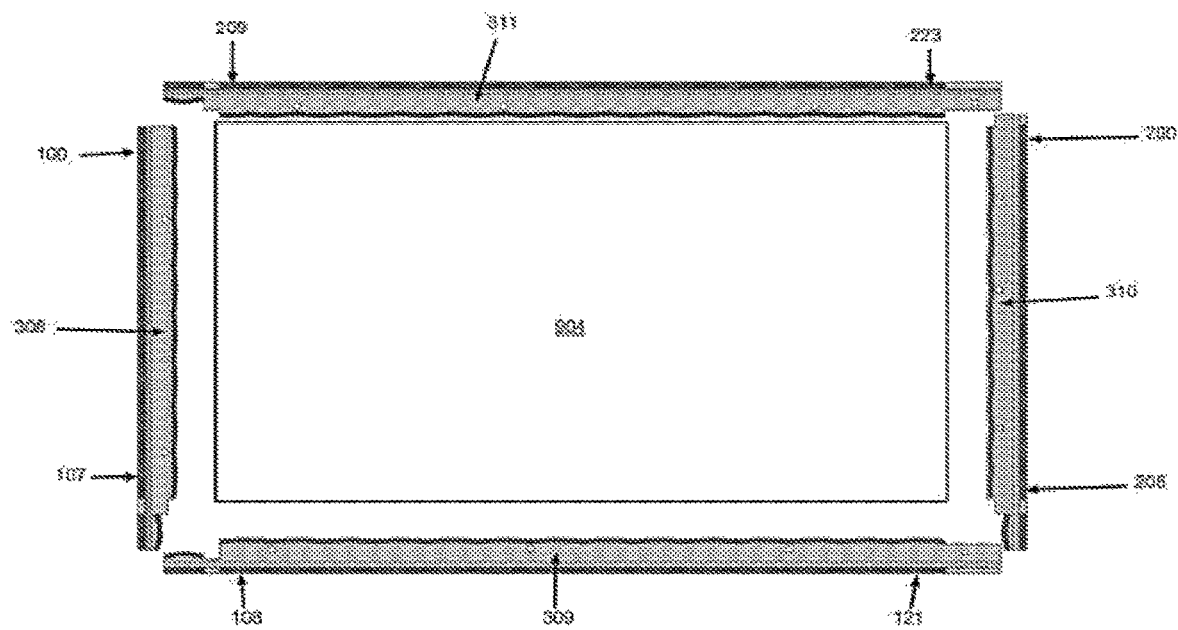
FIG. 13 is a simplified illustration of an optical touchscreen detection area, in accordance with an embodiment of the present invention.

Reference is made to FIG. 13, which is a simplified illustration of an optical touchscreen detection area, in accordance with an embodiment of the present invention. FIG. 13 shows a frame of lenses 308-311 surrounding detection area 904, in accordance with an embodiment of the present invention. Each lens in lens array 308 directs beams from a respective one of emitters 100-107 across detection area 904. Each lens in lens array 310 directs incoming light onto a respective one of detectors 200-208. The number of detectors 200-208 is greater than the number of opposite emitters 100-107, as the emitters and detectors are shift-aligned. This is evident from lens array 310 which features seven full-lenses and two half-lenses at either end of array 310, whereas lens array 308 features eight full lenses. Each lens in lens array 309 directs light beams from a respective one of emitters 108-121 across detection area 904. Each lens, or half-lens at either end, in lens array 311 directs incoming light onto a respective one of detectors 209-223. The number of detectors 209-223 is greater than the number of opposite emitters 108-121, as the emitters and detectors are shift-aligned. This is evident from lens array 311 which features thirteen full-lenses and two half-lenses at either end of array 311, whereas lens array 309 features fourteen full lenses. As discussed hereinabove with reference to FIGS. 5 and 6, light from each emitter is split into multiple separate shaped beams, and each beam arrives at two neighboring detectors along the opposite edge of detection area 904. An emitter-detector pair refers to a portion of the light beam from one emitter that arrives at one opposite detector. The following figures illustrate these portions to indicate the various emitter-detector pairs providing detection information in accordance with embodiments of the present invention.

Figure 14:
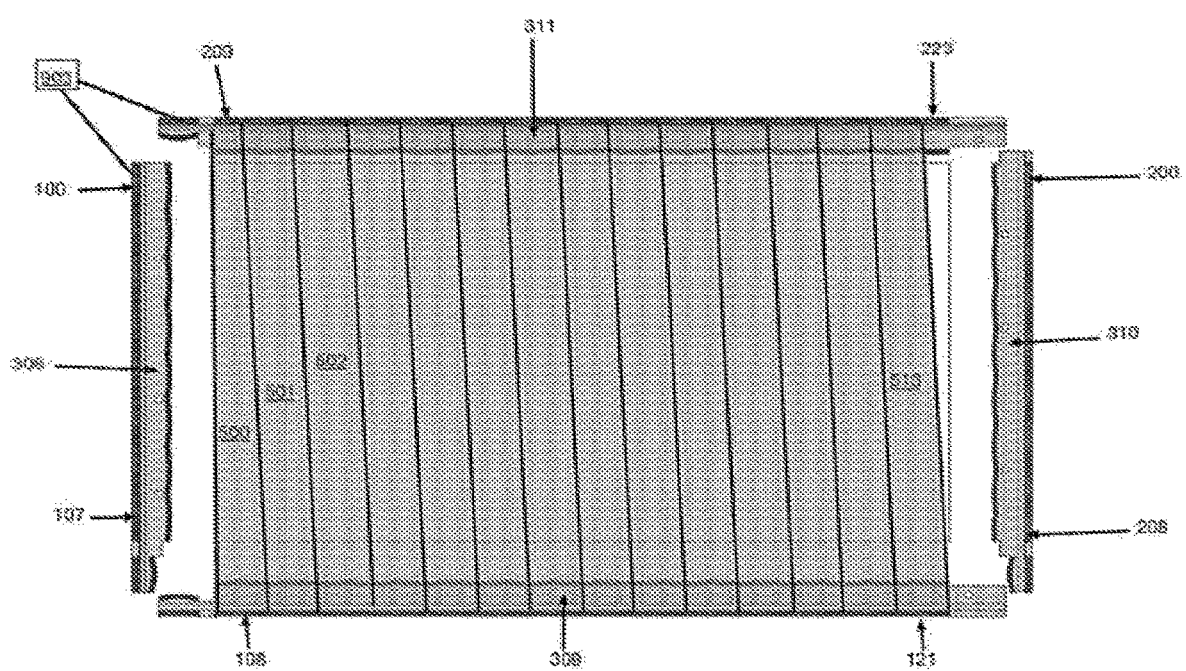
FIGS. 14-16 are simplified illustrations of partially overlapping central light beams in an optical touchscreen, in accordance with an embodiment of the present invention.
Figure 15:
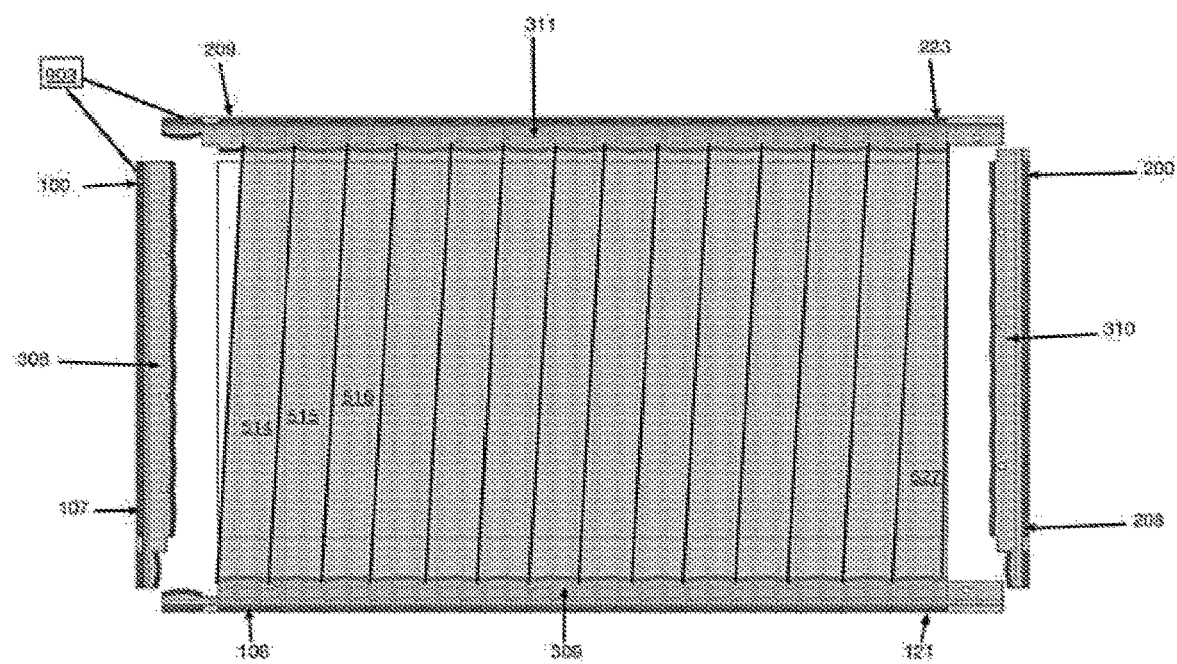
Figure 16:
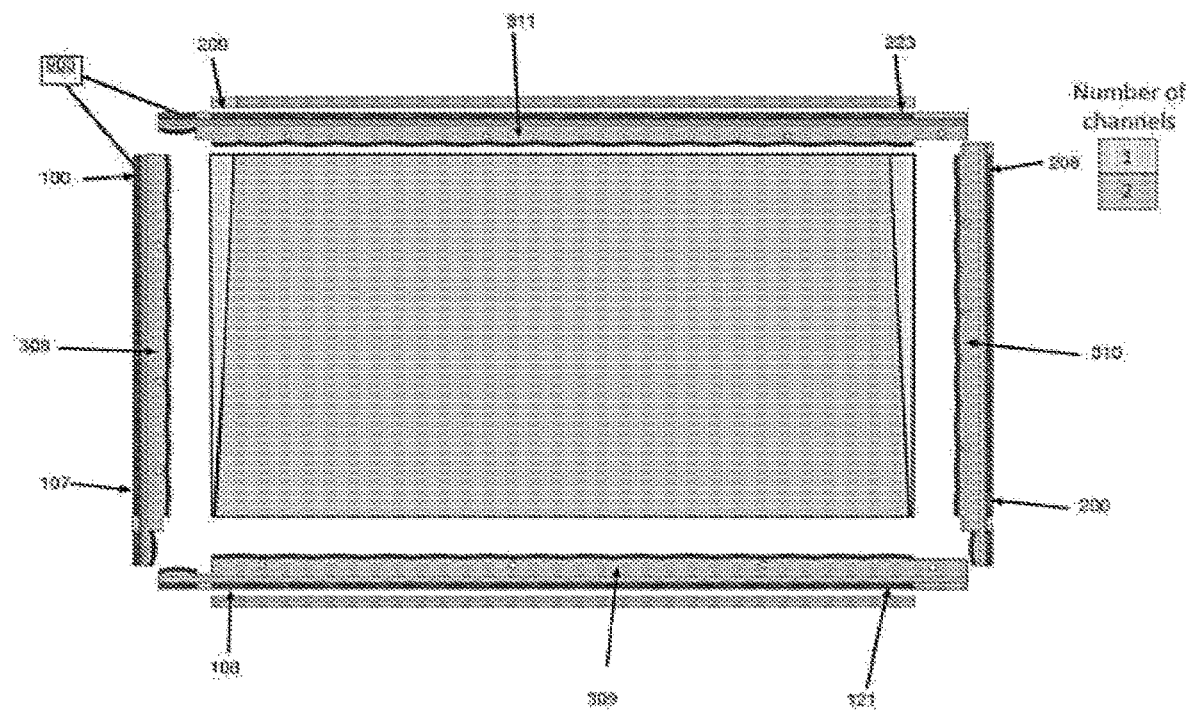

Reference is made to FIGS. 14-16, which are simplified illustrations of partially overlapping central light beams in an optical touchscreen, in accordance with an embodiment of the present invention. FIG. 14 shows a first set of beam portions 500-513, namely, the left-hand portion of the central beam from each emitter. These beam portions provide a first set of emitter-detector detection channels.

FIG. 15 shows a second set of beam portions 514-527, namely, the right-hand portion of the central beam from each emitter. These beam portions provide a second set of emitter-detector detection channels.

FIG. 16 shows coverage of detection area 904 by beam portions 500-527 shown in FIGS. 14 and 15. FIG. 16 indicates that most of detection area 904 is covered by two beam portions; i.e., two detection channels, except for two narrow triangular sections at the outer edges of detection area 904, which are only covered by one detection channel. A similar coverage map exists for the horizontal beams traveling from emitters 100-107 to detectors 200-208.

Figure 17:
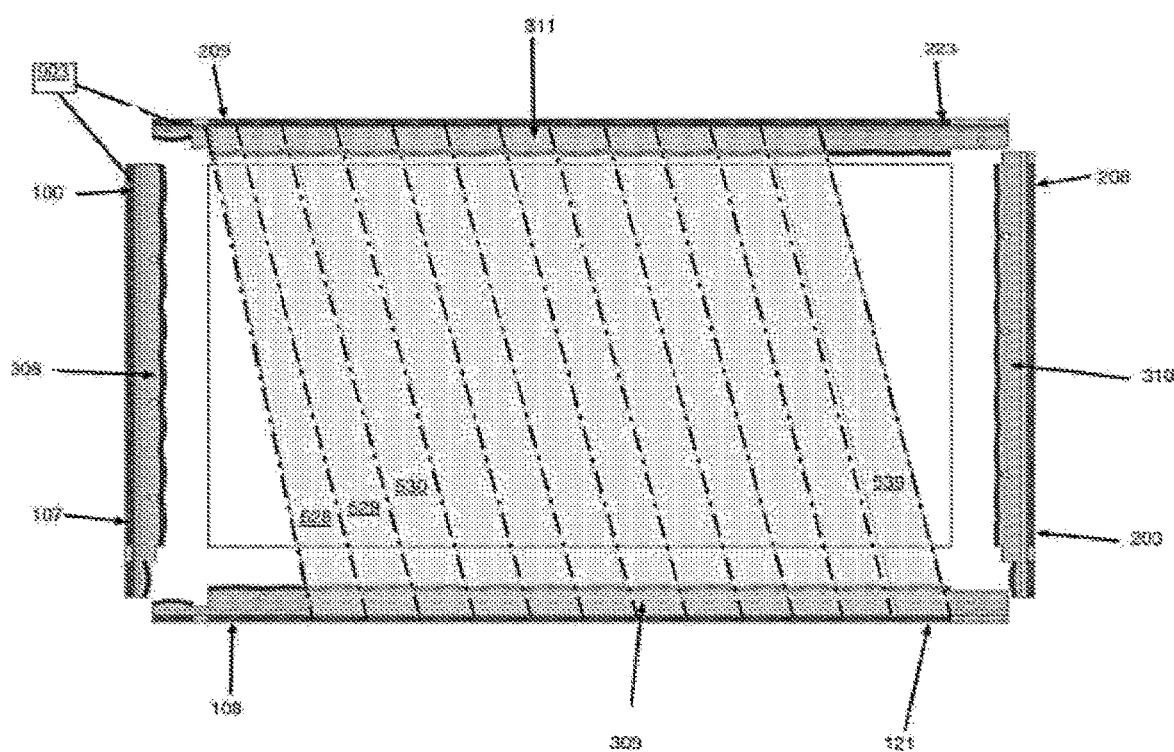
FIGS. 17-19 are simplified illustrations of partially overlapping left-leaning light beams in an optical touchscreen, in accordance with an embodiment of the present invention.
Figure 18:
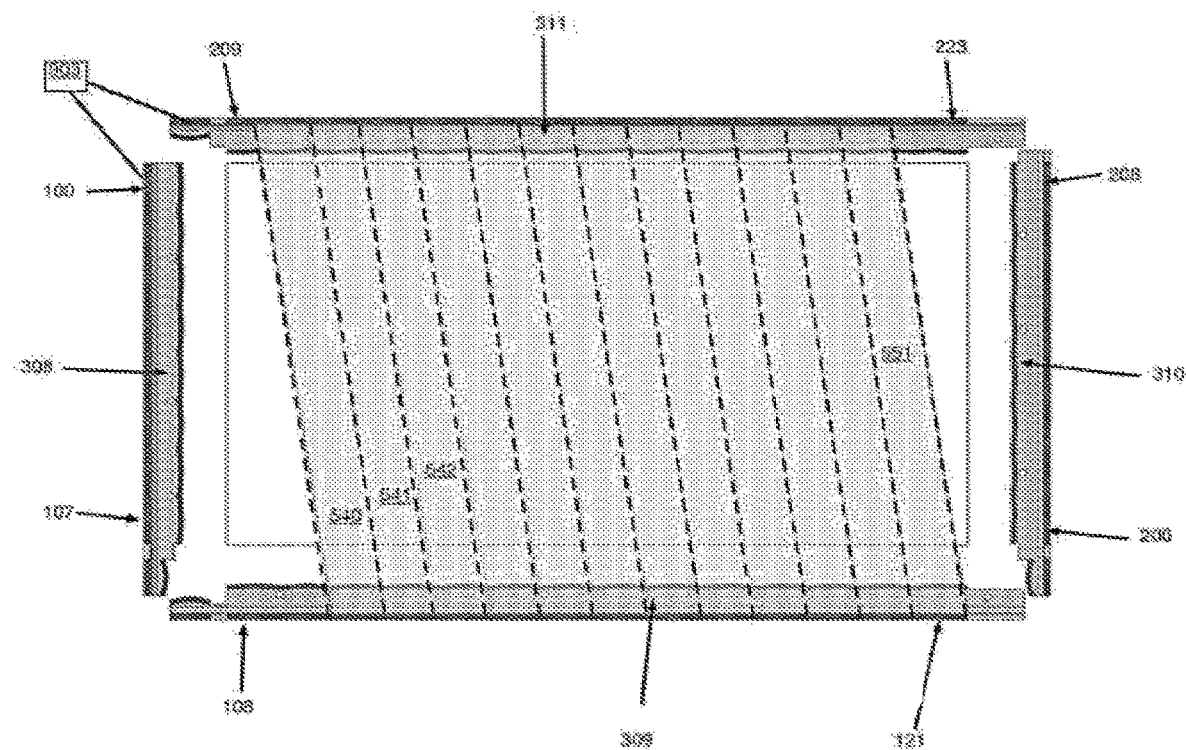
Figure 19:
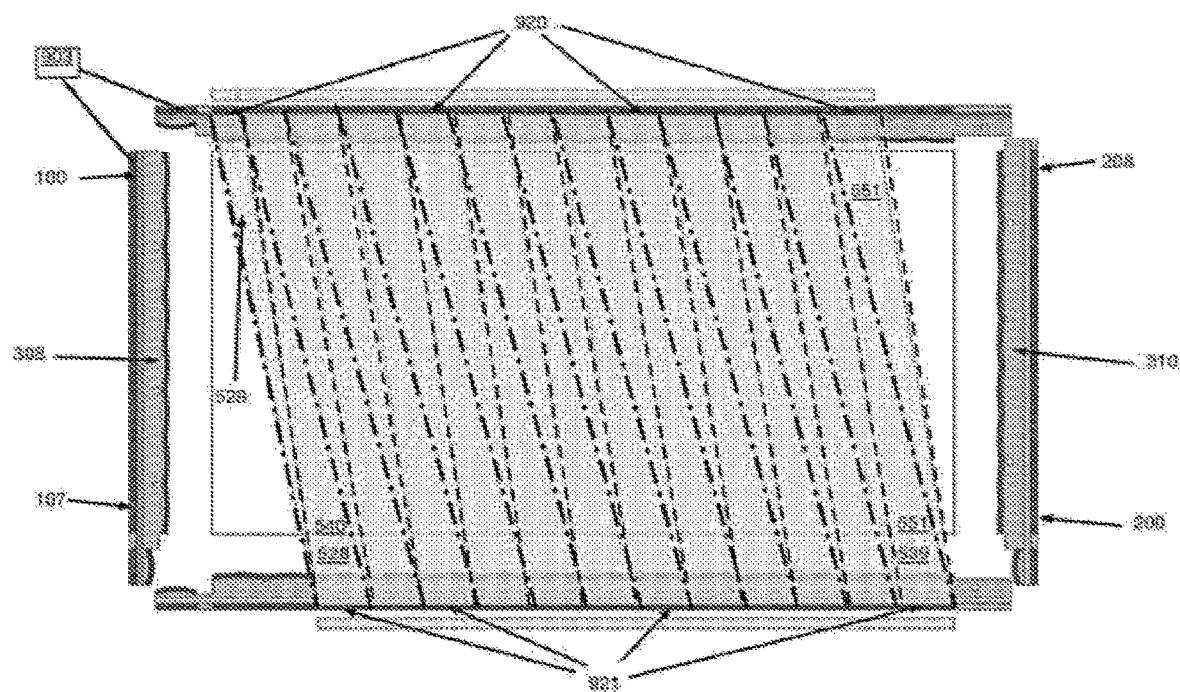

Reference is made to FIGS. 17-19, which are simplified illustrations of partially overlapping left-leaning light beams in an optical touchscreen, in accordance with an embodiment of the present invention. FIG. 17 shows a third set of beam portions 528-539, namely, the left-hand portion of the left-leaning beam from each emitter. These beam portions provide a third set of emitter-detector detection channels.

FIG. 18 shows a fourth set of beam portions 540-551, namely, the right-hand portion of the left-leaning beam from each emitter. These beam portions provide a fourth set of emitter-detector detection channels.

FIG. 19 shows additional coverage of detection area 904 by the left-leaning beams; i.e., beam portions 528-551 shown in FIGS. 17 and 18. FIG. 19 indicates that most of detection area 904 is covered by two beam portions; i.e., two detection channels, except for a first narrow triangular section along the outer left edge of left-leaning beam 528, and a wider triangular section at the outer right edge of left-leaning beam 551, which are only covered by one detection channel. FIG. 19 also illustrates two triangular sections at the outer edges of detection area 904 that are not covered by these left-leaning beams. A similar coverage map exists for the horizontal beams traveling from emitters 100-107 to detectors 200-208. FIG. 19 indicates series 921 of emitters and series 920 of detectors that are active in providing the illustrated detection channels 528-551.

Figure 20:
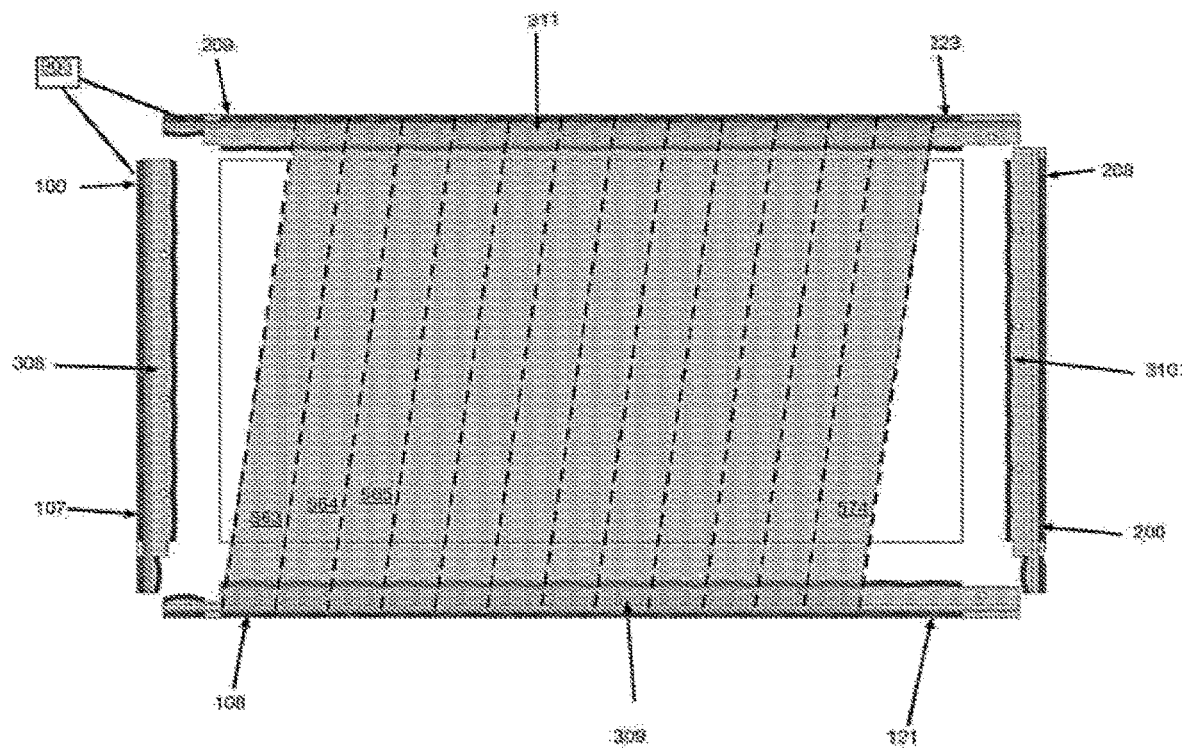
FIGS. 20-22 are simplified illustrations of partially overlapping right-leaning light beams in an optical touchscreen, in accordance with an embodiment of the present invention.
Figure 21:
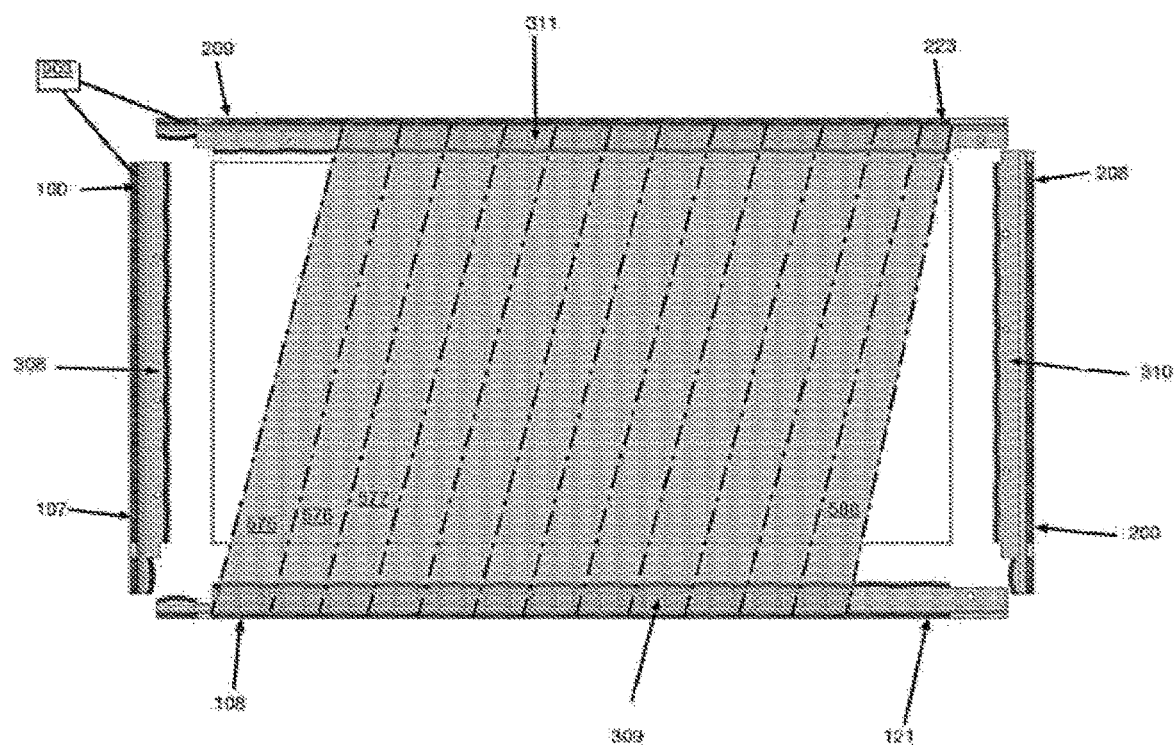
Figure 22:
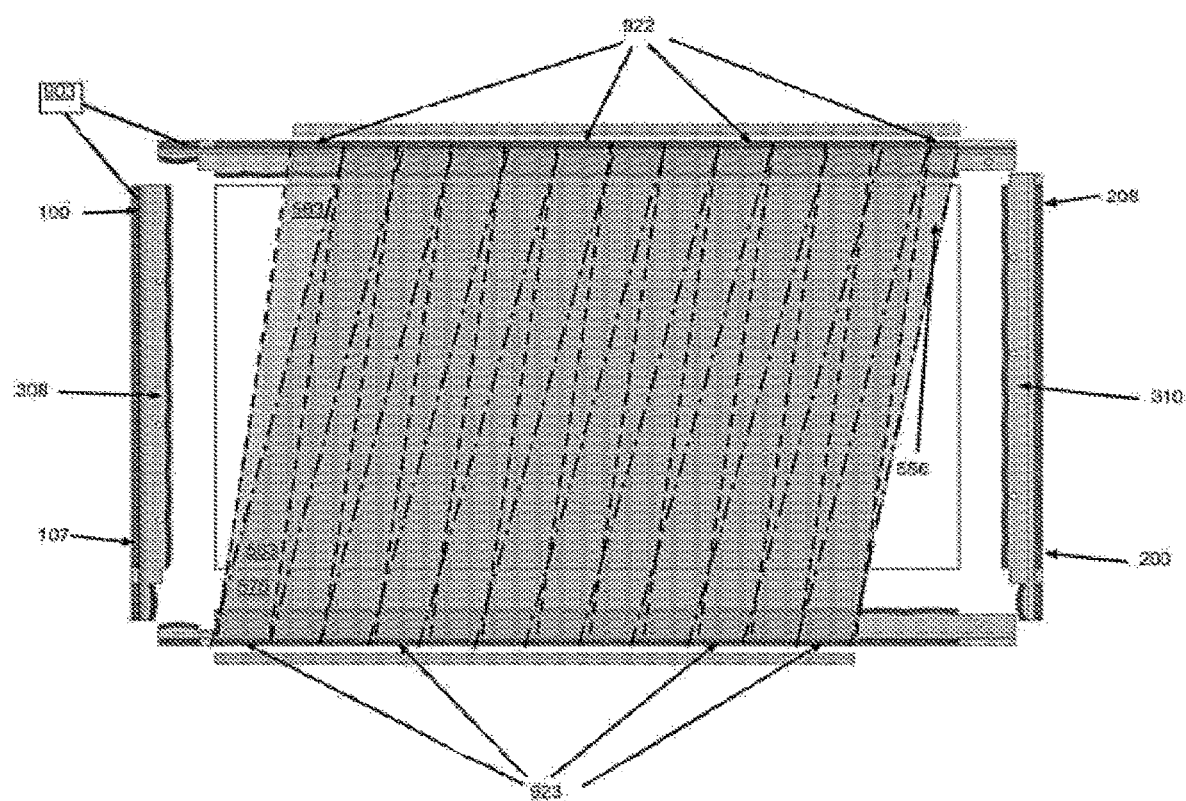

Reference is made to FIGS. 20-22, which are simplified illustrations of partially overlapping right-leaning light beams in an optical touchscreen, in accordance with an embodiment of the present invention. FIG. 20 shows a fifth set of beam portions 563-574; namely, the left-hand portion of the right-leaning beam from each emitter. These beam portions provide a fifth set of emitter-detector detection channels.

FIG. 21 shows a sixth set of beam portions 575-586, namely, the right-hand portion of the right-leaning beam from each emitter. These beam portions provide a sixth set of emitter-detector detection channels.

FIG. 22 shows additional coverage of detection area 904 by the right-leaning beams; i.e., beam portions 563-586 shown in FIGS. 20 and 21. FIG. 22 indicates that most of detection area 904 is covered by two beam portions; i.e., two detection channels, except for a first narrow triangular section along the outer right edge of right-leaning beam 586, and a wider triangular section at the outer left edge of right-leaning beam 563, which are only covered by one detection channel. FIG. 22 also illustrates two triangular sections at the outer edges of detection area 904 that are not covered by these right-leaning beams. A similar coverage map exists for the horizontal beams traveling from emitters 100-107 to detectors 200-208. FIG. 22 indicates series 923 of emitters and series 922 of detectors that are active in providing the illustrated detection channels 563-586.

Reference is made to FIGS. 23 and 24, which are simplified illustrations of the number of overlapping light beams provided for touch detection in different portions of a touchscreen that features the beams of FIGS. 14-22, in accordance with an embodiment of the present invention. FIG. 23 shows coverage of detection area 904 when all six sets of detection channels discussed hereinabove with reference to FIGS. 14-22 are combined. The central portion of detection area 904 is covered by multiple detection signals from all six sets of detection beams—the central, left-leaning and right-leaning beams. However, FIG. 23 indicates areas near the edges of detection area 904 that are covered by only three or four sets of detection signals, and areas covered by only one or two detection signals.

FIG. 24 indicates the number of detection channels covering different portions of detection area 904, in the embodiment illustrated in FIG. 23. The number of detection channels varies between 1-6. A similar map of detection channels applies to the horizontal beams, from emitters 100-107 to detectors 200-208.

Figure 25:
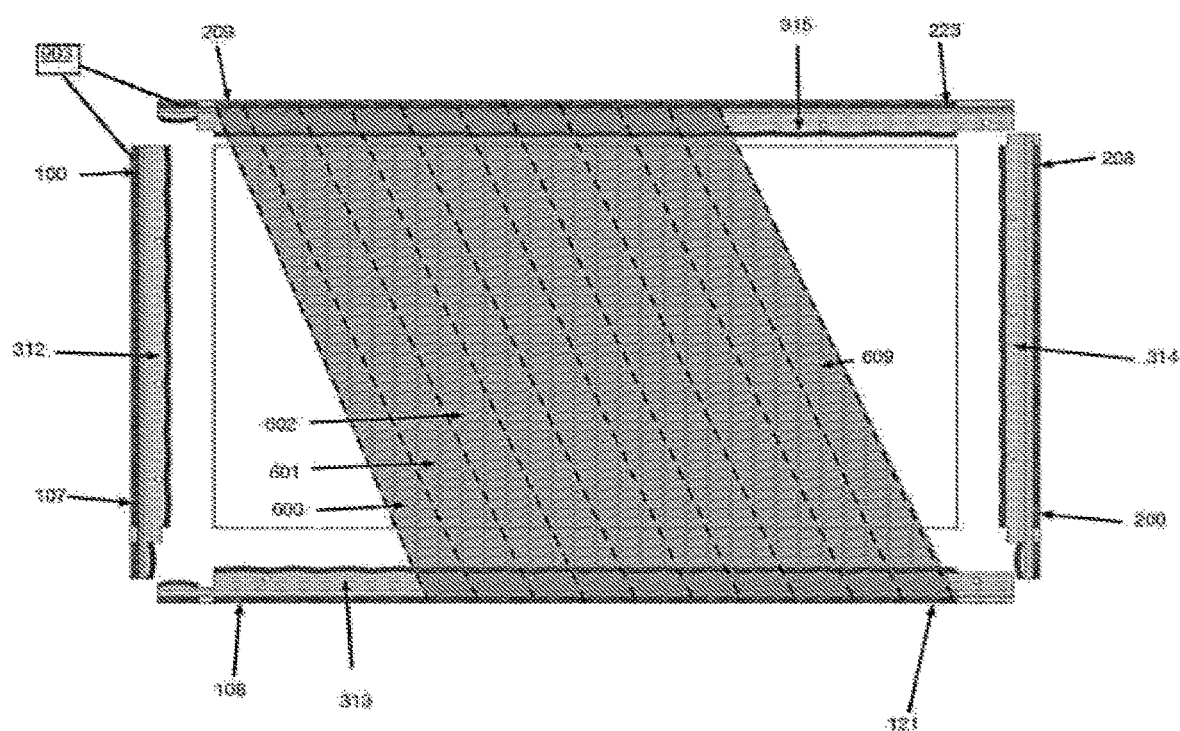
FIGS. 25-27 are simplified illustrations of partially overlapping far left-leaning light beams in an optical touchscreen, in accordance with an embodiment of the present invention.
Figure 26:
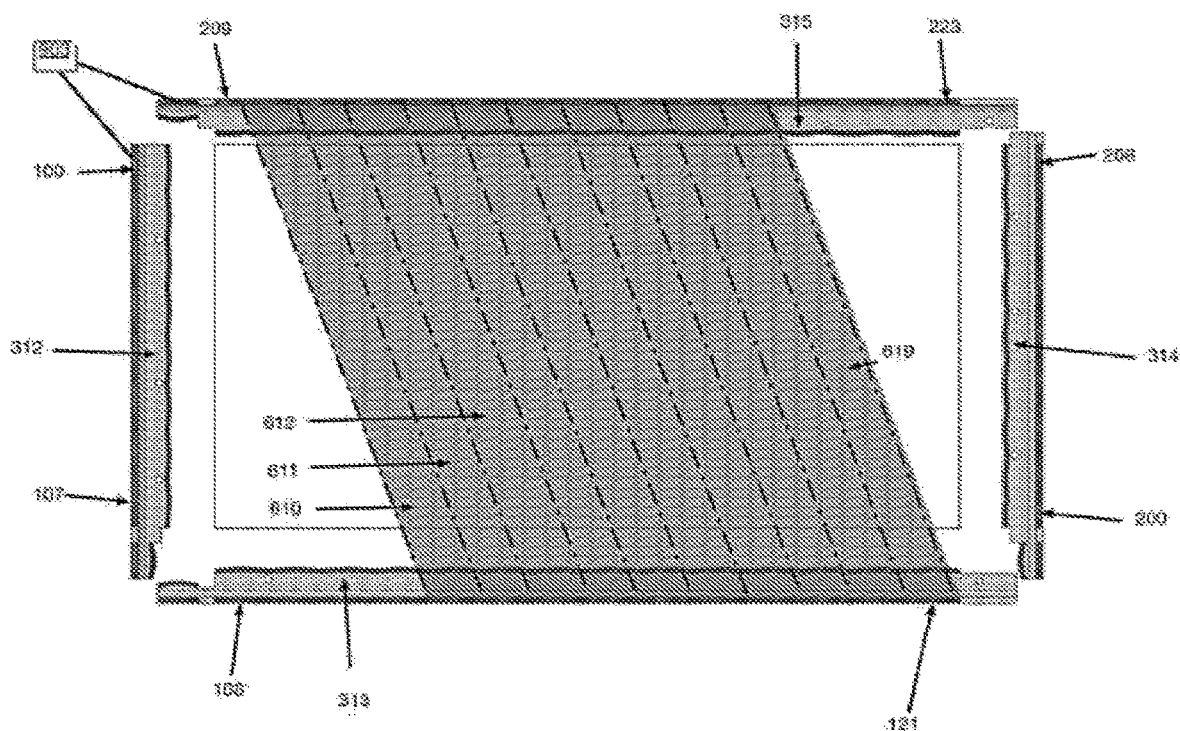
Figure 27:
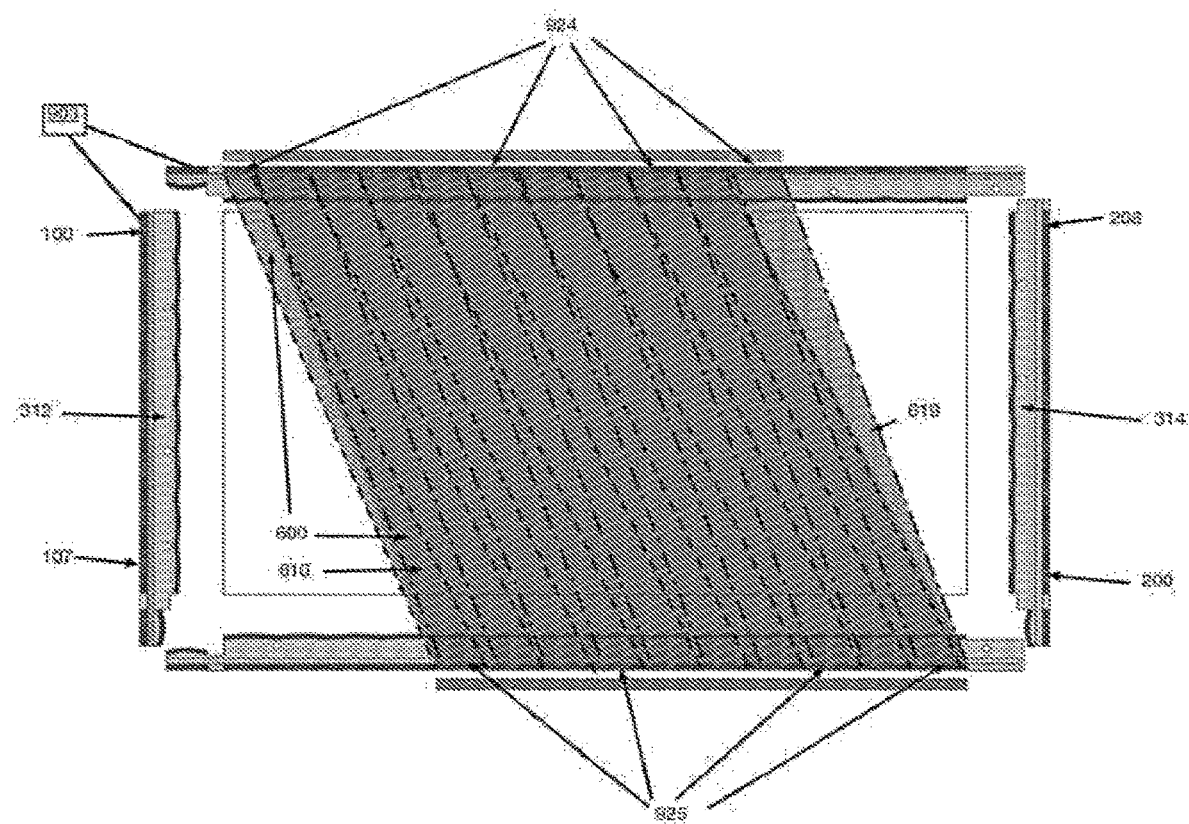

Reference is made to FIGS. 25-27, which are simplified illustrations of partially overlapping far left-leaning light beams in an optical touchscreen, in accordance with an embodiment of the present invention. FIG. 25 illustrates detection channels between each emitter and a respective detector that is offset 4.5 lens pitches from opposite the emitter; FIG. 26 illustrates detection channels between each emitter and a respective detector that is offset 3.5 lens pitches from opposite the emitter; and FIG. 27 illustrates the combined area covered by these two detection channels. FIG. 27 indicates series 925 of emitters and series 924 of detectors that are active in providing the illustrated detection channels 600-619.

Figure 28:
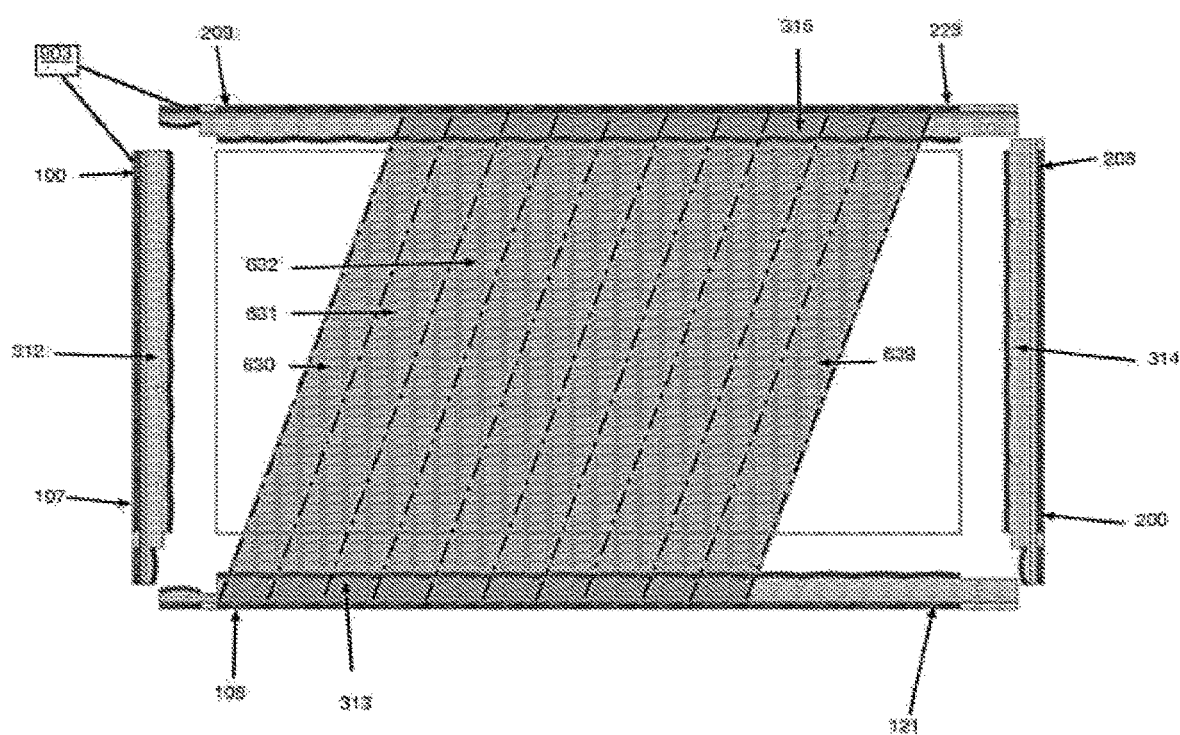
FIGS. 28 and 29 are simplified illustrations of partially overlapping far right-leaning light beams in an optical touchscreen, in accordance with an embodiment of the present invention.
Figure 29:
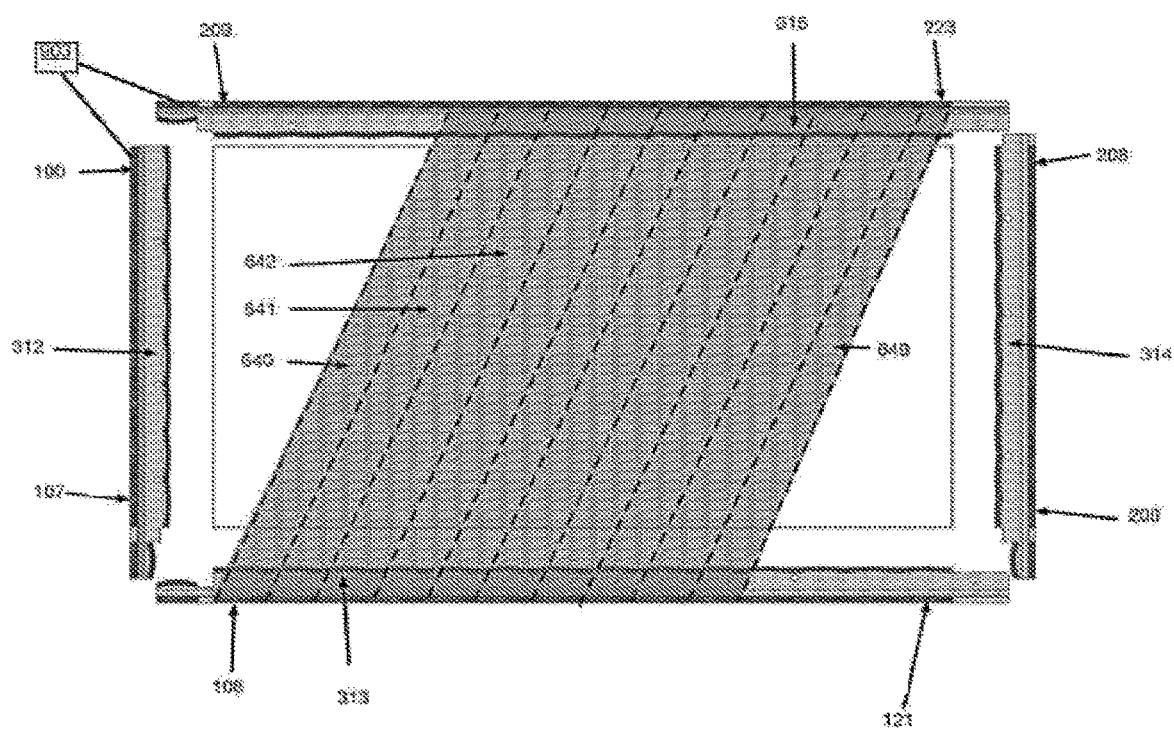

Reference is made to FIGS. 28 and 29, which are simplified illustrations of partially overlapping far right-leaning light beams in an optical touchscreen, in accordance with an embodiment of the present invention. FIG. 28 illustrates detection channels between each emitter and a respective detector that is offset −3.5 lens pitches from opposite the emitter; FIG. 29 illustrates detection channels between each emitter and a respective detector that is offset −4.5 lens pitches from opposite the emitter.

Reference is made to FIGS. 30 and 31, which are simplified illustrations of the number of overlapping light beams provided for touch detection in different portions of a touchscreen, featuring the beams of FIGS. 4, 14, 15 and 25-29, in accordance with an embodiment of the present invention. FIGS. 30 and 31 show the number of channels covering different portions of the detection area that utilize the beams illustrated in FIGS. 4, 14, 15 and 25-29. FIGS. 30 and 31 show that the outer portions of the detection area have fewer detection channels than the central portion of the detection area. FIGS. 30 and 31 indicate series 925, 927 of emitters and series 924, 926 of detectors that are active in providing the illustrated detection channels 600-619.

Reference is made to FIGS. 32 and 33, which are simplified illustrations of optical touchscreens having different optics for outer and inner beams crossing the screen, in accordance with an embodiment of the present invention. FIG. 32 shows detection channels provided along the outer edges of a detection area by beams similar to beams 484 and 486 in FIG. 5. Adding these beams to the system illustrated in FIGS. 30 and 31, provides the outer edge-related portions of the detection area with additional detection channels.

Figure 33A:
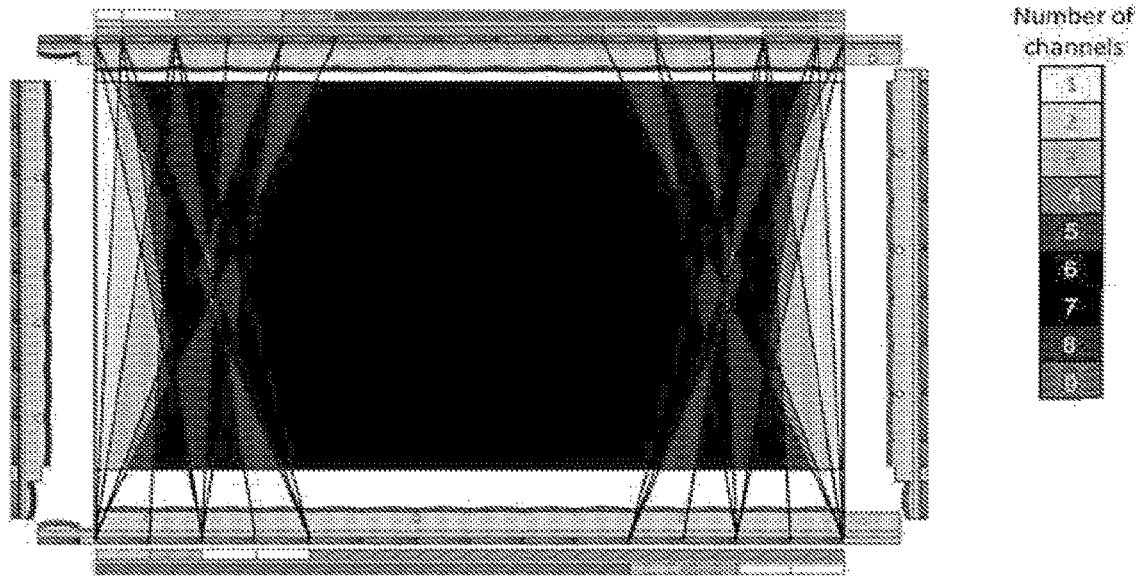
FIG. 33A is a map showing different screen sections in an optical touchscreen, the sections having different numbers of overlapping detection channels, in accordance with an embodiment of the present invention.
Figure 33B:
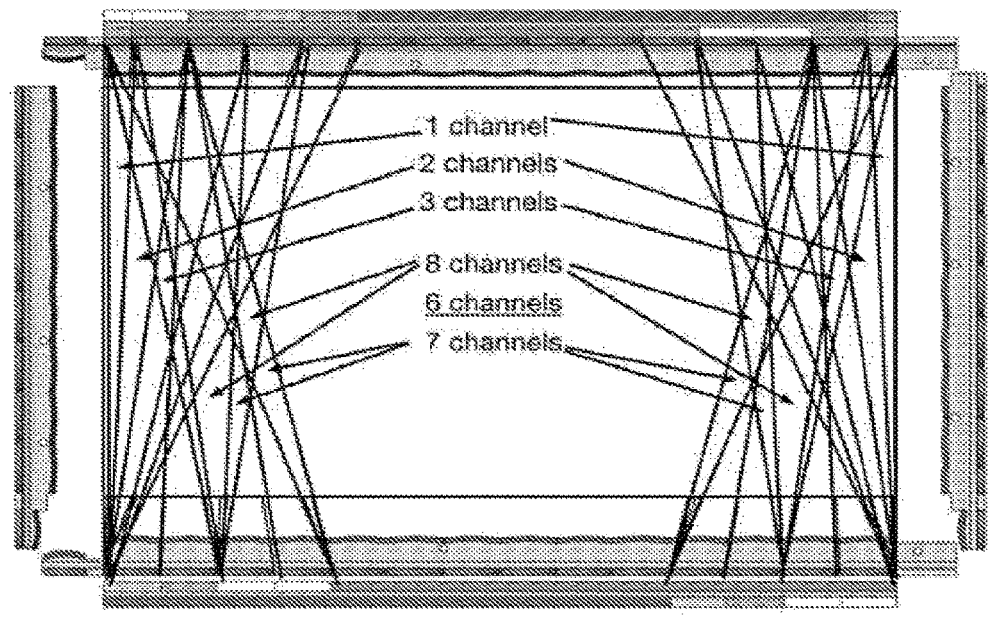
FIG. 33B illustrates the different screen sections of FIG. 33A using text and arrows, in accordance with an embodiment of the present invention.

FIGS. 33A and 33B are two views of detection channel coverage in the system of FIGS. 30 and 31 when the additional beams and channels shown in FIG. 32 are provided along the edges of the detection area. FIG. 33A is color-coded, and FIG. 33B uses text and arrows to indicate the number of detection channels for each section of the touchscreen. FIGS. 33A and 33B show that portions of the detection area have up to nine detection channels. Additional beams with even larger emitter-detector offsets can be added to the optical sensor by modifying the lenses and the emitter-detector activation sequence, and such systems are also within the scope of the present invention.

Figure 34:
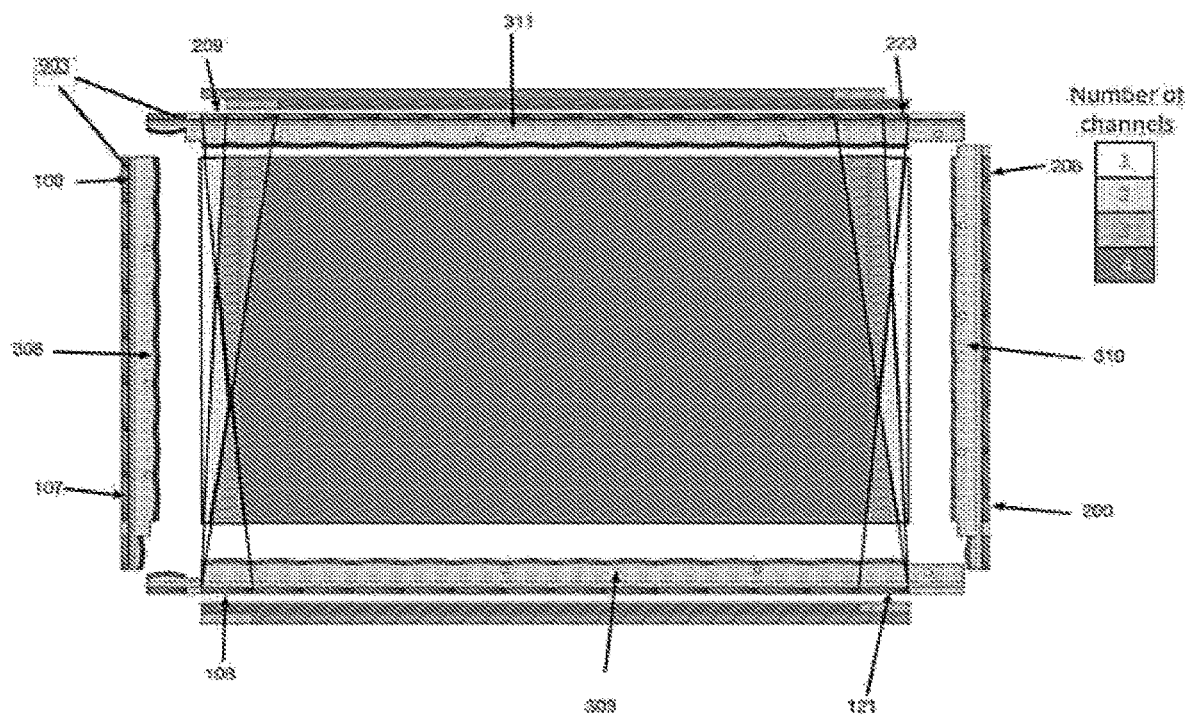
FIG. 34 is a simplified illustration of the number of overlapping light beams provided for touch detection in different portions of a touchscreen for a touchscreen whose lenses are configured to split each emitter beam into two diverging beams, not three, in accordance with an embodiment of the present invention.

As discussed hereinabove, splitting light from each emitter into additional beams adds precision and enables better discrimination of ghost touches. Reference is made to FIG. 34, which is a simplified illustration of the number of overlapping light beams provided for touch detection in different portions of a touchscreen for a touchscreen whose lenses are configured to split each emitter beam into two diverging beams, not three, in accordance with an embodiment of the present invention. FIG. 34 shows the number of beams, or detection channels, that cover each part of a touchscreen when light from each emitter is split into four beams, namely, the two beams 484 and 485 of FIG. 6 and one beam to the left of beam 484 and another beam to the right of beam 485.

The edge portions of the touchscreen have fewer beams, or detection channels, than the center of the screen. In addition, a smaller portion of light from the emitters near the corners is used for touch detection as fewer channels can be used along the screen edges. Therefore, in certain embodiments of the invention, the light channels traversing the screen along the screen edges are shaped to be wider and therefore contain more signal strength than the channels in the middle of the screen. This requires that the lenses near the screen corners are longer than the other lenses, and the light channel is spread across a larger segment of the edge near the corner than the other light channels. In terms of calculating touch locations, each beam is assigned coordinates based on its center line and a weighted sum of all of these coordinates is calculated according to the amount that the signal is blocked. Thus, coordinates are also assigned to the edge beams and they are added to the weighted average, in the same way as the other beams. As a result of the larger lenses and wider beams near edges of the screen, the distance between the central line of a beam near an edge of the screen and its neighboring beam is greater than the distance between the central lines of other neighboring beams.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. An optical sensor detecting locations of objects, comprising:
   a circuit board;
   a plurality of light emitters mounted along a first edge of said circuit board, each light emitter operable when activated to emit light beams, wherein no light emitters are arranged along a second edge of said circuit board, the second edge being opposite the first edge;
   a plurality of light detectors mounted along the second edge of said circuit board, each light detector operable when activated to detect an intensity profile of a light beam entering the light detector;
   a plurality of focusing lenses mounted along a first edge of a rectangular detection area in relation to said light detectors such that each focusing lens refracts light beams from the detection area onto a respective one of said light detectors;
   a plurality of diverging lenses mounted along a second edge of the detection area, the second edge being opposite the first edge, and in relation to said light emitters such that each light emitter, when activated, emits single light beams through a respective one of the diverging lenses, and the diverging lens refracts each single light beam into multiple divergent light beams, wherein each divergent light beam travels across the detection area in a different direction relative to the second edge, and is directed to a respective pair of said focusing lenses, wherein an intensity profile of each divergent light beam has maximum intensity along the center of the beam,
   whereby the divergent light beams from two neighboring emitters that travel across the detection area, in the same direction relative to the second edge, arrive at two respective pairs of said focusing lenses that share a common focusing lens; and
   a processor activating said light emitters and said light detectors, receiving light profile outputs from said light detectors, and calculating a location of an object in the rectangular detection area based on comparing received outputs from a single one of said detectors, that correspond to the divergent light beams from two neighboring emitters that traveled across the detection area in the same direction relative to the second edge, and that were both partially blocked by the object.

2. The optical sensor of claim 1, wherein said plurality of light emitters is shift-aligned with respect to said plurality of light detectors.

3. The optical sensor of claim 1, wherein said focusing lenses along the first edge are shift-aligned with respect to said diverging lenses along the second edge.

4. The optical sensor of claim 1, wherein the comparing performed by said processor comprises interpolating the received light profile outputs.

5. The optical sensor of claim 1, wherein each of said diverging lenses that refracts each single light beam into a number of divergent light beams comprises a repeating pattern of that same number of facets and a single lens separated from the facets by an air gap.

6. The optical sensor of claim 5, wherein said focusing lenses and said diverging lenses have the same structure.

7. The optical sensor of claim 1, wherein, when multiple objects are located in the detection area, said processor calculates candidate locations of the multiple objects based on the comparing, and identifies ghost locations among the candidate locations based on comparing the candidate locations.

8. The optical sensor of claim 1, wherein said processor initially calculates multiple candidate locations of the object in the detection area based on the comparing, and subsequently calculates the location of the object based on comparing the candidate locations.

9. An optical method for detecting locations of objects in a plane, comprising:
   emit single light beams, one beam at a time, at a plurality of locations along a first edge of a detection area;
   refraining from emitting light beams from any location along a second edge of the detection area, the second edge being opposite the first edge;
   refract each single emitted light beam into multiple divergent light beams;
   direct each of the divergent light beams across the detection area to arrive at a respective pair of focusing lenses mounted along a second edge of the detection area, opposite the first edge, wherein an intensity profile of each divergent light beam has maximum intensity along the center of the beam;
   for each of the focusing lenses, measure an intensity profile of that portion of the divergent light beam that enters the focusing lens;
   for each pair of focusing lenses receiving a single divergent light beam, compare the measured intensity profiles for light arriving at each lens; and determine a location of an object in the detection area that partially blocks at least one of the divergent light beams, based on said compares.

10. The optical method of claim 9, wherein each of said focusing lenses comprises a repeating pattern of facets and a single lens separated from the facets by an air gap.

11. The optical method of claim 10, wherein said refract is performed by a diverging lens that has the same structure as said focusing lenses.

12. The optical method of claim 9, wherein said compare comprises interpolation of the measured intensity profiles.

13. The optical method of claim 9, further comprising:
identify candidate locations of multiple objects in the detection area that partially block at least one of the divergent light beams, based on said compares; and
determine ghost locations among the candidate locations based on comparing the candidate locations.

14. The optical method of claim 9, further comprising:
identify candidate locations of the object, based on said compares; and
determine the location of the object based on comparing the candidate locations.

15. An optical method for detecting locations of objects in a plane, comprising:
emit single light beams, one beam at a time, at a plurality of locations along a first edge of a detection area;
refraining from emitting light beams from any location along a second edge of the detection area, the second edge being opposite the first edge;
refract each single emitted light beam into multiple divergent light beams;
direct each of said divergent light beams across the detection area in a different direction, relative to the first edge, to arrive at a respective pair of focusing lenses mounted along a second edge of the detection area, opposite the first edge, wherein an intensity profile of each divergent light beam has maximum intensity along the center of the beam, whereby pairs of the divergent light beams, emitted at neighboring locations along the first edge, that travel across the detection area in the same direction relative to the first edge, arrive at two respective pairs of focusing lenses that share a common focusing lens;
measure an intensity profile of the light that enters each focusing lens;
for each of the pairs of divergent light beams, compare the measured intensity profiles of the light from each of the divergent light beams in the pair, that enters the common focusing lens for that pair; and
determine a location of an object in the detection area that partially blocks at least one of the pairs of divergent light beams, based on said compares.

16. The optical method of claim 15, wherein each of said focusing lenses comprises a repeating pattern of facets and a single lens separated from the facets by an air gap.

17. The optical method of claim 16, wherein said refract is performed by diverging lenses that have the same structure as the focusing lenses.

18. The optical method of claim 15, wherein said compare comprises interpolation of the measured intensity profiles.

19. The optical method of claim 15, further comprising:
identify candidate locations of multiple objects in the detection area that partially block at least one of the divergent light beams, based on said compares; and
determine ghost locations among the candidate locations based comparing the candidate locations.

20. The optical method of claim 15, further comprising:
identify candidate locations of the object, based on said compares; and
determine the location of the object based on comparing the candidate locations.

* * * * *